United States Patent
El-Hibri et al.

(10) Patent No.: US 9,777,156 B2
(45) Date of Patent: *Oct. 3, 2017

(54) PAEK/PAES COMPOSITIONS

(71) Applicant: SOLVAY SPECIALTY POLYMERS USA, LLC., Alpharetta, GA (US)

(72) Inventors: Mohammad Jamal El-Hibri, Atlanta, GA (US); Keshav Gautam, Duluth, GA (US); Ahmed Khan, Alpharetta, GA (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,421

(22) PCT Filed: Nov. 8, 2013

(86) PCT No.: PCT/EP2013/073330
§ 371 (c)(1),
(2) Date: May 7, 2015

(87) PCT Pub. No.: WO2014/072447
PCT Pub. Date: May 15, 2014

(65) Prior Publication Data
US 2015/0259531 A1 Sep. 17, 2015

Related U.S. Application Data

(60) Provisional application No. 61/724,689, filed on Nov. 9, 2012.

(30) Foreign Application Priority Data

Nov. 28, 2012 (EP) .................................. 12194541

(51) Int. Cl.
C08L 81/06 (2006.01)
C08L 71/00 (2006.01)
C08G 65/40 (2006.01)
C08K 7/06 (2006.01)

(52) U.S. Cl.
CPC .......... *C08L 81/06* (2013.01); *C08G 65/4012* (2013.01); *C08L 71/00* (2013.01); *C08G 2650/40* (2013.01); *C08K 7/06* (2013.01)

(58) Field of Classification Search
CPC ............ C08K 7/14; C08L 71/00; C08L 81/06
USPC .................. 524/494; 525/471, 535
See application file for complete search history.

(56) References Cited

U.S. PATENT DOCUMENTS

| 3,647,751 | A | 3/1972 | Darsow | |
|---|---|---|---|---|
| 4,000,149 | A | 12/1976 | Isaac et al. | |
| 9,000,687 | B2 * | 4/2015 | Lai | H05B 33/0866 315/294 |
| 2005/0228149 | A1 * | 10/2005 | Trivedi | C08F 293/00 525/535 |
| 2008/0312387 | A1 | 12/2008 | El-Hibri et al. | |
| 2009/0048379 | A1 * | 2/2009 | Weinberg | C08L 71/00 524/420 |
| 2009/0124767 | A1 | 5/2009 | El-Hibri | |
| 2009/0281227 | A1 | 11/2009 | Stern et al. | |
| 2010/0144955 | A1 * | 6/2010 | El-Hibri | C08G 75/23 524/514 |
| 2010/0273957 | A1 | 10/2010 | Srinivasan et al. | |
| 2011/0104417 | A1 * | 5/2011 | Wang | C08G 65/4037 428/36.9 |

FOREIGN PATENT DOCUMENTS

| EP | 332012 A1 | 9/1989 |
|---|---|---|
| EP | 1884538 A1 | 2/2008 |
| JP | 9183632 A | 7/1997 |
| WO | 2005095491 A1 | 10/2005 |
| WO | 2007039538 A1 | 4/2007 |
| WO | 2013092492 A1 | 6/2013 |
| WO | 2013092628 A1 | 6/2013 |

OTHER PUBLICATIONS

Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham P.A. (Editors).

* cited by examiner

Primary Examiner — Tae H Yoon
(74) Attorney, Agent, or Firm — Jarrod N. Raphael; Dwight M. Benner, II

(57) ABSTRACT

A composition [composition (C)] comprising from 1 to 90% by weight (wt. %) of at least one poly(aryl ether ketone) [(PAEK) polymer, herein after], from to 25 wt. % of at least one polyphenylsulfone polymer [(PPSU) polymer, herein after], from 1 to 90% wt. % of at least one poly(aryl ether sulfone) polymer [(P1) polymer, herein after], selected from a group consisting of at least one high temperature poly(aryl ether sulfone) polymer [(PAES$_{HT}$) polymer, herein after] and at least one polyethersulfone polymer [(PESU) polymer, herein after]; from 0 to 50% wt. % of at least one reinforcing filler, and wherein all % are based on the total weight of the composition (C).

14 Claims, No Drawings

PAEK/PAES COMPOSITIONS

This application is a 371 national stage application of PCT/EP2013/073330 filed on 8 Nov. 2013, which claims priority to U.S. provisional application No. 61/724,689 filed on 9 Nov. 2012 and to European application No. 12194541.4 filed on 28 Nov. 2012, the whole content of each of these applications being incorporated herein by reference for all purposes.

FIELD OF INVENTION

The present invention relates to high performance polyarylether polymer compositions and articles made there from. In particular, the present invention relates to ternary composition comprising at least one poly(aryletherketone) (PAEK), at least one polyphenylsulfone (PPSU), at least one other poly(arylethersulfone) polymer, and optionally certain reinforcing fillers.

BACKGROUND OF THE INVENTION

The blending of aromatic poly(arylethersulfone) (PAES) polymers, such as notably polyphenylsulfone (PPSU), polyethersulfone (PESU), bisphenol A polysulfone (PSU) and high temperature sulfone (HTS) polymers, for example the commercially available EpiSpire® HTS high temperature sulfone polymer and Supradel® HTS high temperature sulfone polymer, with poly(aryletherketone) PAEK polymers including in particular poly(etheretherketone) (PEEK), poly(etherketone) (PEK) and poly(etherketoneketone) (PEKK) polymers have known a growing interest because of the exceptional properties that can be achieved.

Certain PEEK/PPSU blends offer a good and unique combination of properties and have been valued for years in specific end uses in particular in plumbing end-use applications such as fittings, tubes, manifolds etc. However, these blends are rather expensive due to the high cost of both the PEEK and the PPSU components.

PAEK/PAES polymer blends are also known for their exceptional overall properties and have been used in a variety of applications such as notably medical device and instrument applications such as sterilizable surgical instruments and instrument handles, sterilizable cases and trays, and related components, aircraft light structural components and mobile electronic device components but certain PAEK/PAES polymer blends are characterized by some drawbacks.

One of the main issues in blending aromatic poly(arylethersulfone) polymers with poly(aryletherketone) polymers is the limited compatibility between the two polymers. Especially, the PEEK/PESU and PEEK/high temperature sulfone (HTS) polymer blends are suffering from this limited compatibility exhibiting consequently poor impact resistance, and poor melt processability manifested as severe die swell during melt compounding operations used to prepare these blends. The die swell results in difficulty producing these blends on large industrial scale because the process is unstable due to the inability to maintain a uniform extrudate strand thickness during the process. For example, it has been found that blends of PEEK and PESU when melt compounded exhibit strong die swell because of the above mentioned limited compatibility between the two polymers.

Thus, there remains a need to improve the compatibility between poly(aryletherketone) polymers and aromatic poly(arylethersulfone) polymers other than PPSU, thereby affording compositions having enhanced toughness and impact resistance, while maintaining all the other exceptional properties and being cost attractive over the existing prior art PAEK/PAES blends.

SUMMARY OF INVENTION

The Applicant has now found surprisingly that it is possible to provide PAEK/PAES compositions advantageously fulfilling the above mentioned needs, especially having improved compatibility properties.

The invention thus pertains to a composition [composition (C)] comprising:
  from 1 to 90% by weight (wt. %) of at least one poly(aryl ether ketone) [(PAEK) polymer, herein after], wherein more than 50% by moles of the recurring units of said (PAEK) polymer are recurring units ($R_{PAEK}$) comprising a Ar-C(O)-Ar' group, with Ar and Ar', equal to or different from each other, being aromatic groups. The recurring units ($R_{PAEK}$) are generally selected from the group consisting of formulae (J-A) to (J-O), herein below:

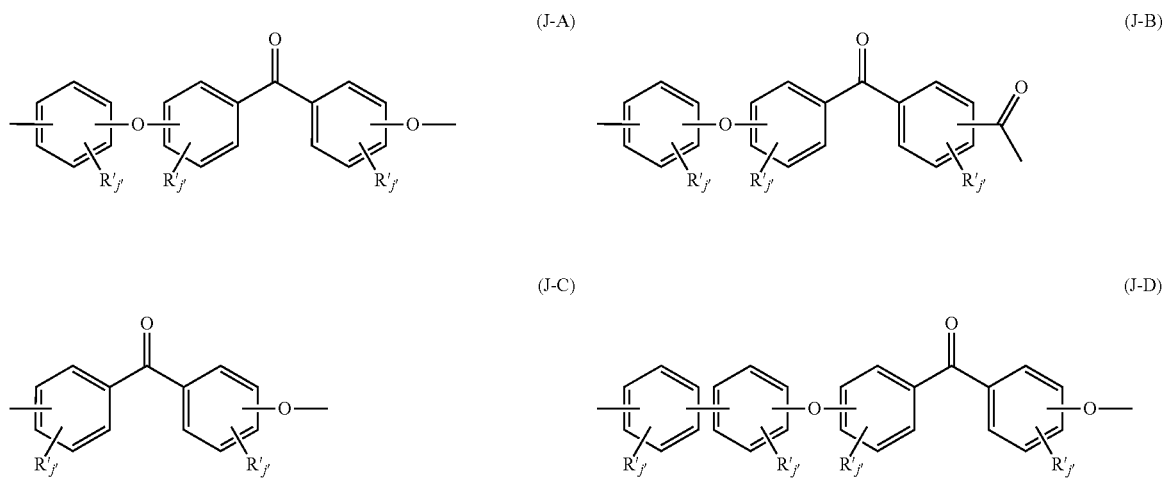

-continued
(J-E)
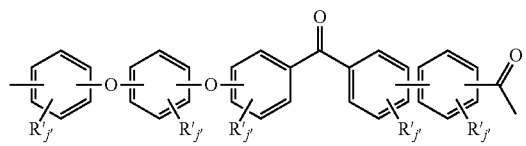
(J-F)
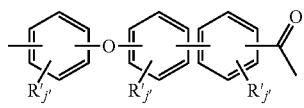
(J-G)
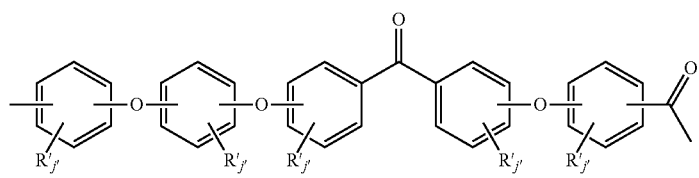
(J-H)
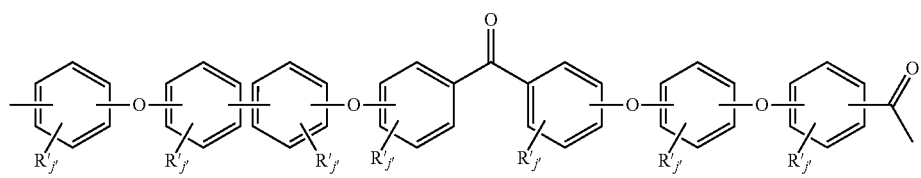
(J-I)
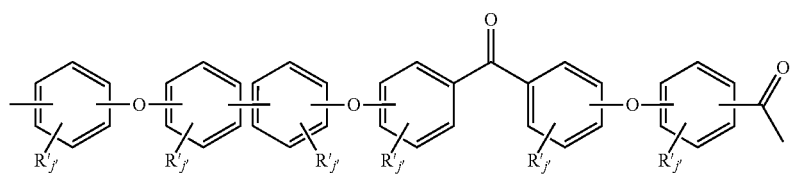
(J-J)
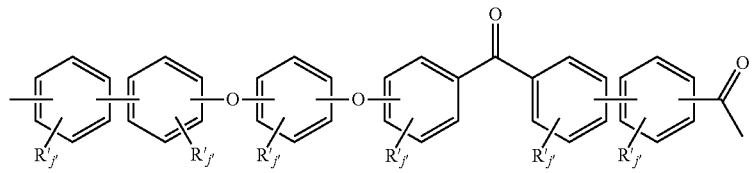
(J-K)
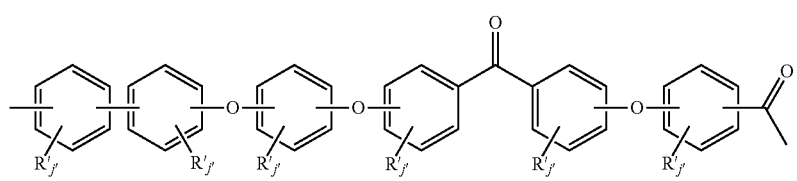
(J-L)
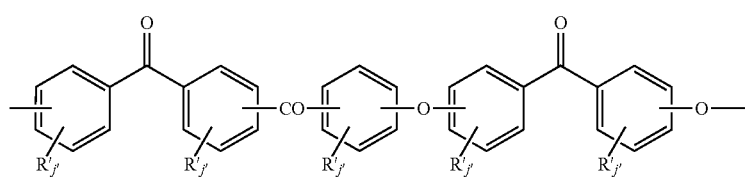
(J-M)
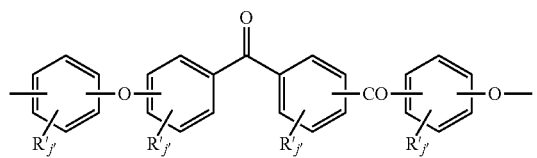
(J-N)
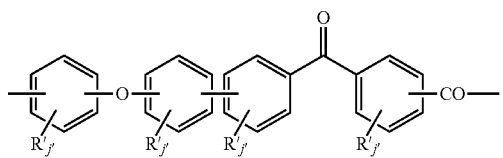

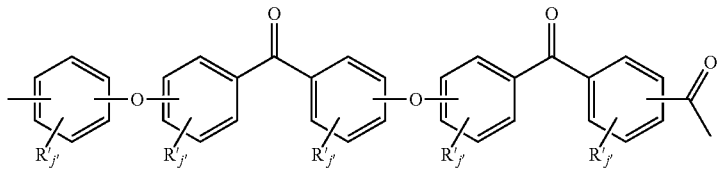

(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j is zero or is an integer from 0 to 4;

from 1 to 25 wt. % of at least one polyphenylsulfone polymer [(PPSU) polymer, herein after], wherein more than 50% by moles of the recurring units of said (PPSU) polymer are recurring units ($R_{PPSU}$) of formula (A), herein below:

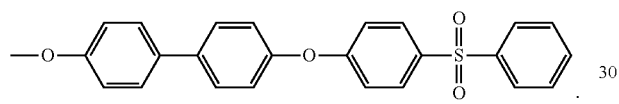

(A)

from 1 to 90% wt. of at least one poly(aryl ether sulfone) polymer [(P1) polymer, herein after], selected from a group consisting of:
(i) at least one high temperature poly(aryl ether sulfone) polymer [($PAES_{HT}$) polymer, herein after] wherein more than 50% by moles of the recurring units of said ($PAES_{HT}$) polymer are recurring units ($R_{PAES}$), said recurring units ($R_{PAES}$), equal to or different from each other at each occurrence, complying with formula (B):

—$Ar^1$-(T-$Ar^2$)$_n$—O—$Ar^3$—$SO_2$—[$Ar^4$-(T-$Ar^2$)$_n$—$SO_2$]$_m$—$Ar^5$—O—  (formula B)

wherein:
$Ar^1$, $Ar^2$ and $Ar^4$ equal to or different from each other and at each occurrence, are independently an aromatic mono- or polynuclear group;
$Ar^3$ and $Ar^5$ equal to or different from each other and at each occurrence, are independently aromatic moieties selected from the group consisting of those complying with following formulae:

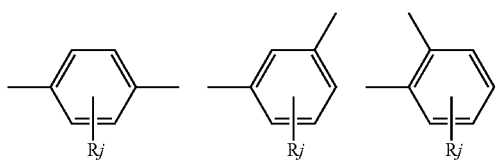

wherein each R, equal to or different form each other, is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and each j, equal to or different from each other, are independently 0, 1, 2, 3 or 4,
each of T, equal to or different from each other, is a bond or a divalent group optionally comprising one or more than one heteroatom;
n is 0, 1, 2, 3 or 4; and
m is 1, 2, 3 or 4.
(ii) and at least one polyethersulfone polymer [(PESU) polymer, herein after]; wherein more than 50% moles of the recurring units of said (PESU) polymer are recurring units ($R_{PESU}$), said recurring units ($R_{PESU}$), equal to or different from each other at each occurrence, complying with formula (C):

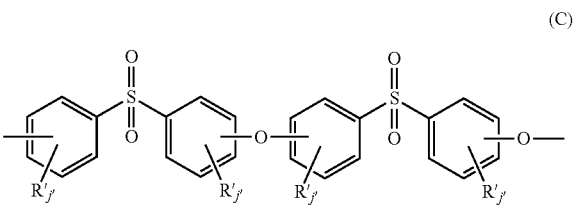

(C)

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each of j', equal to or different from each other and at each occurrence, is independently zero or is an integer from 0 to 4; and from 0 to 50% wt. of at least one reinforcing filler, and wherein all % wt. are based on the total weight of the composition (C).

As it will be explained in more detail in the specification, with reference to the working experiments, the Applicant has surprisingly found that the addition of (PPSU) polymer to mixtures of (PAEK) polymer and (P1) polymer, as detailed above, is particularly effective in improving mechanical properties and more precisely in enhancing toughness without being bound by this theory the Applicant thinks that (PPSU) polymer act as a compatibilizer between (PAEK) and (P1) polymer, thus providing unexpected properties enhancement.

In the rest of the text, the expression "(PAEK) polymer" is understood, for the purposes of the present invention, both in the plural and the singular, that is to say that the inventive composition may comprise one or more than one (PAEK) polymer. It is understood that the same applies for the expressions "(PPSU) polymer", "(P1) polymer", "($PAES_{HT}$) polymer", "(PESU) polymer", and the "reinforcing filler".

Poly(Aryl Ether Ketone) Polymer

As said, more than 50% by moles of the recurring units of the (PAEK) polymer are recurring units ($R_{PAEK}$), as detailed above.

In recurring units ($R_{PAEK}$), the respective phenylene moieties may independently have 1,2-, 1,4- or 1,3-linkages to the other moieties different from R' in the recurring unit.

Preferably, said phenylene moieties have 1,3- or 1,4-linkages, more preferably they have 1,4-linkage.

Still, in recurring units ($R_{PAEK}$), j' is preferably at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

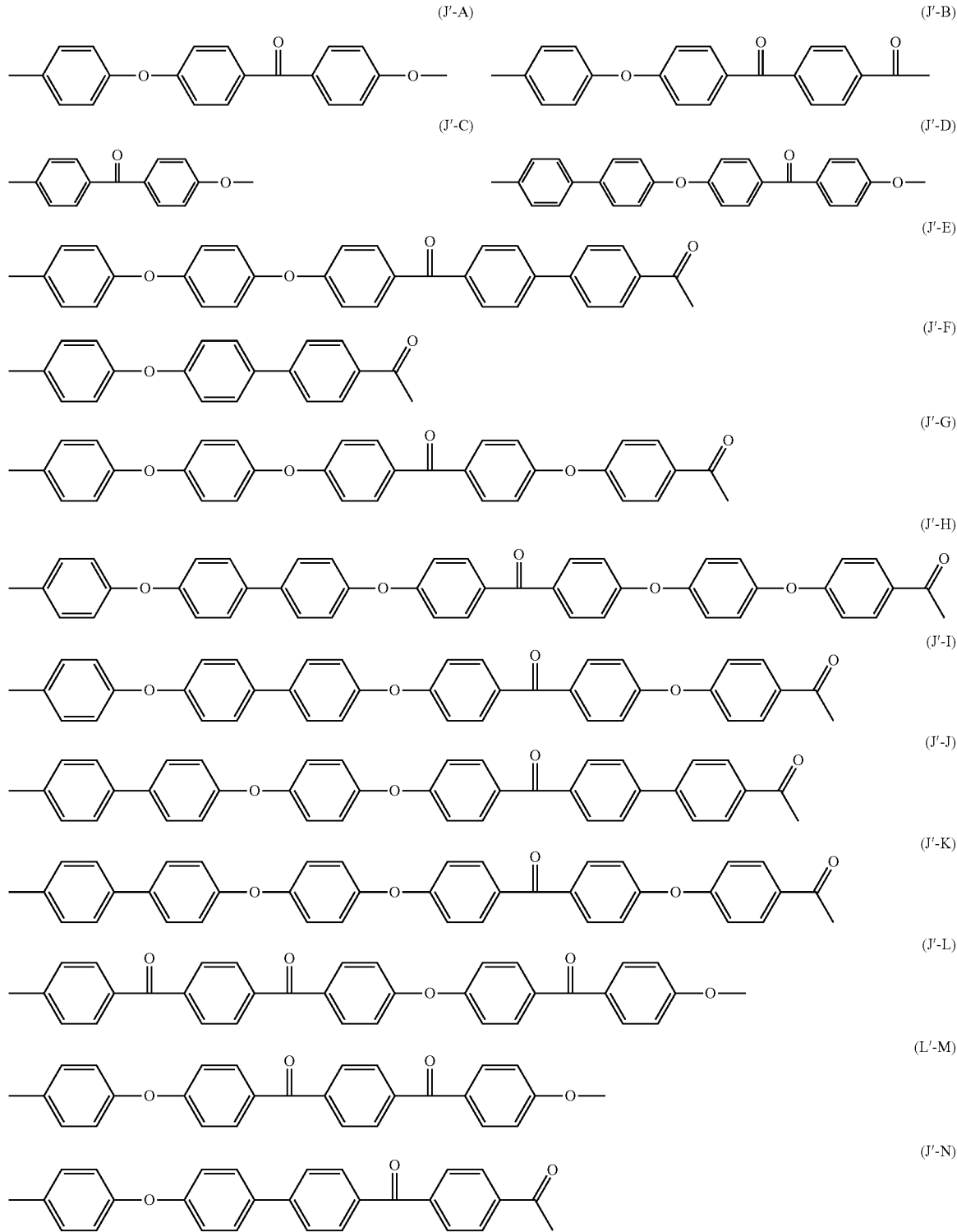

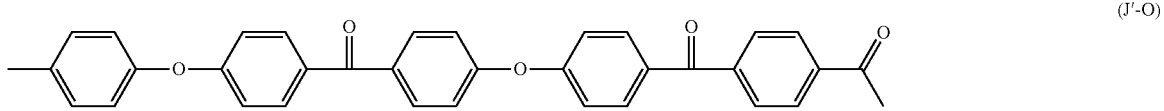

(J'-O)

Still more preferably, ($R_{PAEK}$) are chosen from:

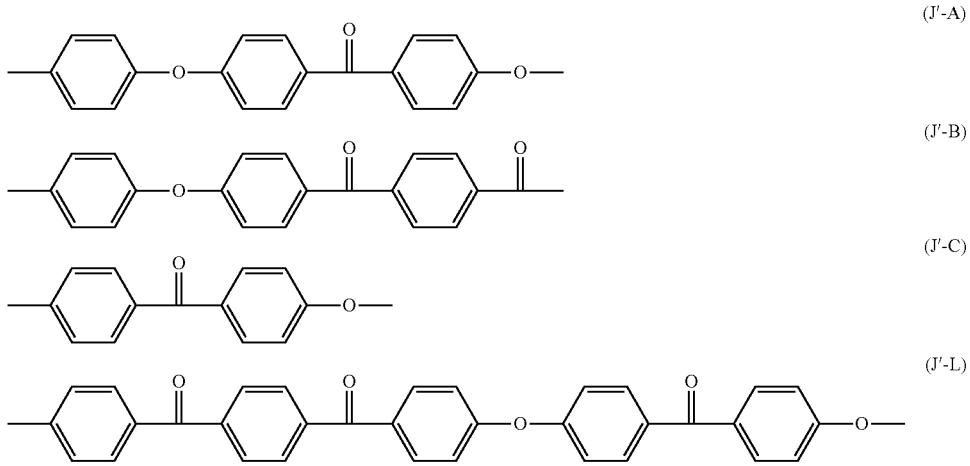

(J'-A)

(J'-B)

(J'-C)

(J'-L)

In the (PAEK) polymer, as detailed above, preferably more than 60% by moles, more preferably more than 80% by moles, still more preferably more than 90% by moles of the recurring units are recurring units ($R_{PAEK}$), as above detailed.

Still, it is generally preferred that substantially all recurring units of the (PAEK) polymer are recurring units ($R_{PAEK}$), as detailed above; chain defects, or very minor amounts of other units might be present, being understood that these latter do not substantially modify the properties of the (PAEK) polymer.

The (PAEK) polymer may be notably a homopolymer, a random, alternate or block copolymer. When the (PAEK) polymer is a copolymer, it may notably contain (i) recurring units ($R_{PAEK}$) of at least two different formulae chosen from formulae (J-A) to (J-O), or (ii) recurring units ($R_{PAEK}$) of one or more formulae (J-A) to (J-O) and recurring units ($R^{*}_{PAEK}$) different from recurring units ($R_{PAEK}$).

As will be detailed later on, the (PAEK) polymer may be a polyetheretherketone polymer [(PEEK) polymers, herein after]. Alternatively, the (PAEK) polymer may be a polyetherketoneketone polymer [(PEKK) polymer, herein after], a polyetherketone polymer [(PEK) polymer, hereinafter] or a polyetherketoneetherketoneketone polymer [(PEKEKK) polymer, herein after].

The (PAEK) polymer may also be a blend composed of at least two different (PAEK) polymers chosen from the group consisting of (PEKK) polymers, (PEEK) polymers, (PEK) polymers and (PEKEKK) polymers, as above detailed.

For the purpose of the present invention, the term "(PEEK) polymer" is intended to denote any polymer of which more than 50% by moles of the recurring units are recurring units ($R_{PAEK}$) of formula J'-A.

Preferably more than 75% by moles, preferably more than 85% by moles, preferably more than 95% by moles, preferably more than 99% by moles of the recurring units of the (PEEK) polymer are recurring units of formula J'-A. Most preferably all the recurring units of the (PEEK) polymer are recurring units of formula J'-A.

For the purpose of the present invention, the term "(PEKK) polymer" is intended to denote any polymer of which more than 50% by moles of the recurring units are recurring units ($R_{PAEK}$) of formula J'-B.

Preferably more than 75% by moles, preferably more than 85% by moles, preferably more than 95% by moles, preferably more than 99% by moles of the recurring units of the (PEKK) polymer are recurring units of formula J'-B. Most preferably all the recurring units of the (PEKK) polymer are recurring units of formula J'-B.

For the purpose of the present invention, the term "(PEK) polymer" is intended to denote any polymer of which more than 50% by moles of the recurring units are recurring units ($R_{PAEK}$) of formula J'-C.

Preferably more than 75% by moles, preferably more than 85% by moles, preferably more than 95% by moles, preferably more than 99% by moles of the recurring units of the (PEK) polymer are recurring units of formula J'-C. Most preferably all the recurring units of the (PEK) polymer are recurring units of formula J'-C.

For the purpose of the present invention, the term "(PEKEKK) polymer" is intended to denote any polymer of which more than 50% by moles of the recurring units are recurring units ($R_{PAEK}$) of formula J'-L.

Preferably more than 75% by moles, preferably more than 85% by moles, preferably more than 95% by moles, preferably more than 99% by moles of the recurring units of the (PEKEKK) polymer are recurring units of formula J'-L. Most preferably all the recurring units of the (PEKEKK) polymer are recurring units of formula J'-L.

Excellent results were obtained when the (PAEK) polymer was a (PEEK) homopolymer, i.e. a polymer of which substantially all the recurring units of the (PEEK) polymer are recurring units of formula J'-A, wherein chain defects, or very minor amounts of other units might be present, being understood that these latter do not substantially modify the properties of the (PEEK) homopolymer.

The (PAEK) polymer can have a intrinsic viscosity (IV) of at least 0.50 dl/g, preferably at least 0.60 dl/g, more preferably at least 0.70 dl/g, as measured in 95-98% sulfuric acid (d=1.84 g/ml) at a (PAEK) polymer concentration of 0.1 g/100 ml.

The IV of the (PAEK) polymer can notably be equal to or less than 1.40 dl/g, preferably equal to or less than 1.30 dl/g, more preferably equal to or less than 1.20 dl/g, most preferably equal to or less than 1.15 dl/g, as measured in 95-98% sulfuric acid (d=1.84 g/ml) at a (PAEK) polymer concentration of 0.1 g/100 ml.

Good results have been obtained with (PAEK) polymers having an IV from 0.70 dl/g to 1.15 dl/g, as measured in 95-98% sulfuric acid (d=1.84 g/ml) at a (PAEK) polymer concentration of 0.1 g/100 ml.

The measurement is generally performed using a No 50 Cannon-Fleske viscometer; IV is measured at 25° C. in a time less than 4 hours after dissolution.

The (PAEK) polymer has a melt viscosity of advantageously at least 0.05 kPa·s, preferably at least 0.08 kPa·s, more preferably at least 0.1 kPa·s, still more preferably at least 0.12 kPa·s at 400° C. and a shear rate of 1000 s$^{-1}$, as measured using a capillary rheometer in accordance with ASTM D3835.

As capillary rheometer, a Kayeness Galaxy V Rheometer (Model 8052 DM) can be used.

The PAEK polymer has a melt viscosity of advantageously at most 1.00 kPa·s, preferably at most 0.80 kPa·s, more preferably at most 0.70 kPa·s, even more preferably at most 0.60 kPa·s, most preferably at most 0.50 kPa·s at 400° C. and a shear rate of 1000 s$^{-1}$, as measured using a capillary rheometer in accordance with ASTM D3835.

Non limitative examples of commercially available (PAEK) polymers suitable for the invention include the KETASPIRE® polyetheretherketone commercially available from Solvay Specialty Polymers USA, LLC.

The (PAEK) polymer can be prepared by any method known in the art for the manufacture of poly(aryl ether ketone)s.

Polyetheretherketone homopolymers are commercially available notably from Solvay Specialty Polymers, L.L.C. as KETASPIRE® and GATONE® poly(etheretherketone)s.

Should the composition (C) not comprise the reinforcing filler, the weight percent of the (PAEK) polymer in the composition (C) is generally of at least 10 wt. %, preferably of at least 20 wt. %, more preferably of at least 30 wt. %, more preferably of at least 35 wt. %, more preferably of at least 40 wt. %, based on the total weight of the composition (C). It is further understood that in the absence of the reinforcing filler, the weight percent of the polymer (PAEK) in the composition (C) will generally be of at most 85 wt. %, more preferably of at most 80 wt. %, more preferably of at most 75 wt. %, more preferably of at most 70 wt. %, based on the total weight of the composition (C).

In the absence of the reinforcing filler, excellent results were obtained when the composition (C) comprised the (PAEK) polymer in an amount of 35-75 wt. % based on the total weight of the composition (C).

Should the composition (C) comprise the reinforcing filler, the weight percent of the (PAEK) polymer in the composition (C) is generally of at least 2 wt. %, preferably of at least 5 wt. %, based on the total weight of the composition (C). It is further understood that in the presence of the reinforcing filler, the weight percent of the polymer (PAEK) in the composition (C) will generally be of at most 70 wt. %, more preferably of at most 60 wt. %, more preferably of at most 50 wt. %, more preferably of at most 40 wt. %, most preferably of at most 30 wt. %, based on the total weight of the composition (C).

In the presence of the reinforcing filler, excellent results were obtained when the composition (C) comprised the (PAEK$_{HMF}$) polymer in an amount of 5-30 wt. % based on the total weight of the composition (C).

Polyphenylsulfone (PPSU) Polymer

As said, the polymer composition (C) comprises at least one (PPSU) polymer.

In a preferred embodiment of the present invention, more than 75% by moles more preferably more than 90% by moles, more preferably more than 99% by moles, even more preferably substantially all the recurring units of the (PPSU) polymer are recurring units ($R_{PPSU}$) of formula (A), chain defects, or very minor amounts of other units might be present, being understood that these latter do not substantially modify the properties.

The (PPSU) polymer may be notably a homopolymer, or a copolymer such as a random or a block copolymer. When the (PPSU) polymer is a copolymer, its recurring units are advantageously a mix of recurring units ($R_{PPSU}$) of formula (A) and of recurring units ($R_{PPSU}$*), different from recurring units ($R_{PPSU}$), such as notably recurring units of formula (D), (E) or (F) represented hereafter:

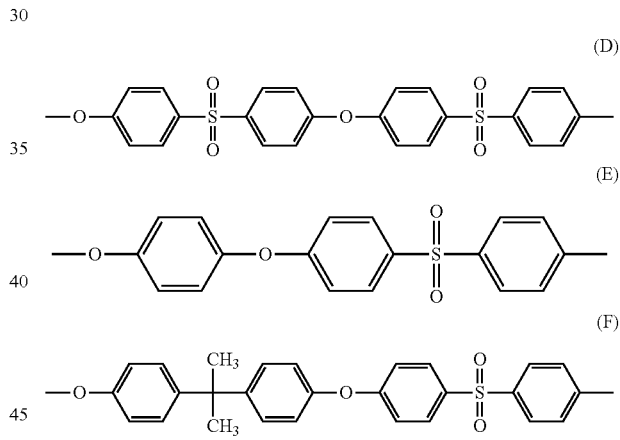

and mixtures thereof.

The (PPSU) polymer can also be a blend of the previously cited homopolymer and copolymer.

RADEL® R PPSU from Solvay Specialty Polymers USA, L.L.C. is an example of a commercially available polyphenylsulfone homopolymer.

(PPSU) polymers can be prepared by known methods.

The (PPSU) polymer has advantageously a melt flow rate (MFR) equal to or higher than 5 g/10 min at 365° C. and under a load of 5.0 kg, preferably equal to or higher than 10 g/10 min at 365° C. and under a load of 5.0 kg, more preferably equal to or higher than 14 g/10 min at 365° C. and under a load of 5.0 kg, as measured in accordance with ASTM method D1238; to measure said melt flow rate, a Tinius Olsen Extrusion Plastometer melt flow test apparatus can be used.

Upper boundary for the melt flow rate of the (PPSU) polymer is not critical and will be selected by the skilled in the art as a matter of routine work. It is nevertheless understood that when the (PPSU) polymer possibly comprised in the composition (C) possesses advantageously a melt flow rate of at most 100 g/10 min, preferably at most 60 g/10 min, more preferably at most 40 g/10 min, still more preferably at most 25 g/10 min, most preferably at most 20 g/10 min, when measured in accordance with ASTM method D1238 at 365° C. and under a load of 5.0 kg.

According to certain embodiments, the composition (C) will comprise a (PPSU) polymer having a melt flow rate of 25 g/10 min or less, preferably of 20 g/10 min or less: in other words, the PPSU polymer of this embodiment will have a melt flow rate, measured as above detailed, ranging from at least 10 g/10 min to 25 g/10 min or less, preferably ranging from at least 14 g/10 min to 20 g/10 min or less. RADEL® R PPSU is an example of a (PPSU) polymer suitable for being used in this embodiment.

The (PPSU) polymer weight average molecular weight can be 20,000 to 100,000 grams per mole (g/mol) as determined by gel permeation chromatography using ASTM D5296 with polystyrene standards. In some embodiments the PPSU polymer weight average molecular weight can be 40,000 to 80,000 grams per mole (g/mol).

The Applicant has found that the (PPSU) polymer is especially well suited for providing compatibilized polymer compositions (C).

In the polymer composition (C), the (PPSU) polymer is present in an amount of advantageously at least 2 wt. %, more preferably at least 3 wt. %, still more preferably at least 4 wt. %, even more preferably at least 5 wt. %, based on the total weight of the polymer composition (C).

The (PPSU) polymer is also present in an amount of advantageously at most 25 wt. %, preferably at most 20 wt. %, more preferably at most 15 wt. %, still more preferably at most 10 wt. %, based on the total weight of the polymer composition (C).

Preferably, the (PPSU) polymer is present in an amount ranging from 2 to 20 wt. %, still more preferably from 3 to 15 wt. % and most preferably from 4 to 10 wt. %, based on the total weight of the polymer composition (C).

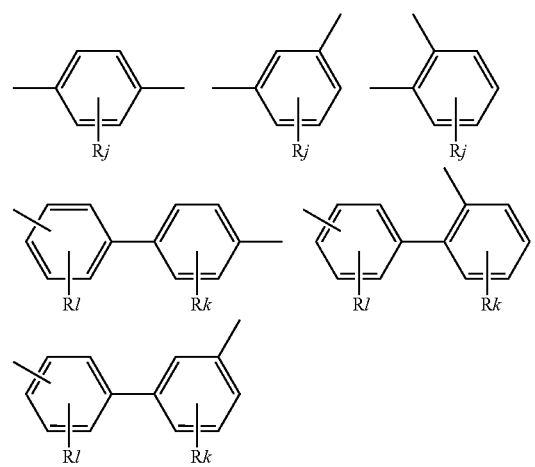

wherein each R, equal to or different form each other, is selected from the group consisting of:
hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4.

In these preferred recurring units ($R_{PAES}$), each of T, equal to or different from each other, is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R^aC=CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_q$— and —$(CF_2)_q$— with q=integer from 1 to 6, or an aliphatic divalent group, linear or branched, of up to 6 carbon atoms; and mixtures thereof.

More preferred recurring units ($R_{PAES}$) are those complying with following formula (G), as detailed below:

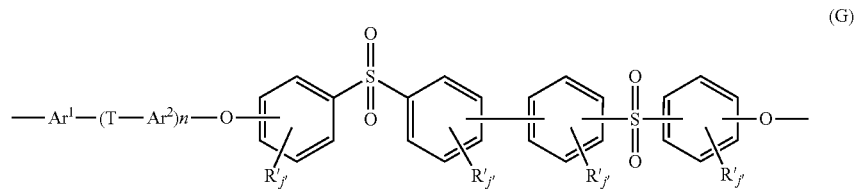

(G)

(P1) Polymer

As said, the (P1) polymer can be selected from a group consisting of (i) at least one ($PAES_{HT}$) polymer, as detailed above and (ii) at least one (PESU) polymer, as detailed above.

($PAES_{HT}$) Polymer

As said, more than 50% by moles of the recurring units of the ($PAES_{HT}$) polymer are recurring units ($R_{PAES}$), wherein said recurring units ($R_{PAES}$), equal to or different from each other at each occurrence, are complying with formula (B), as detailed above.

According to a preferred embodiment of the present invention, $Ar^1$, $Ar^e$ and $Ar^4$ in the formula (E), mentioned above, are equal or different from each other and are aromatic moieties preferably selected from the group consisting of those complying with following formulae:

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other and at each occurrence, is independently zero or is an integer from 0 to 4;

$Ar^1$ and $Ar^2$ are equal or different from each other and at each occurrence, are independently aromatic moieties preferably selected from the group consisting of those complying with following formulae:

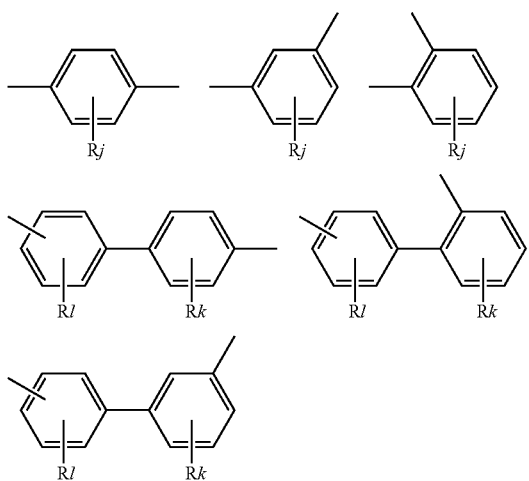

wherein each of R is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4;

each of T, equal to or different from each other, is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R^a C=CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_q$— and —$(CF_2)_q$— with q=integer from 1 to 6, or an aliphatic divalent group, linear or branched, of up to 6 carbon atoms; and mixtures thereof; and n is 0, 1, 2, 3 or 4;

Even more preferred recurring units ($R_{PAES}$) are those selected from the group consisting of formulae (H) to (K), as below detailed, and mixtures thereof:

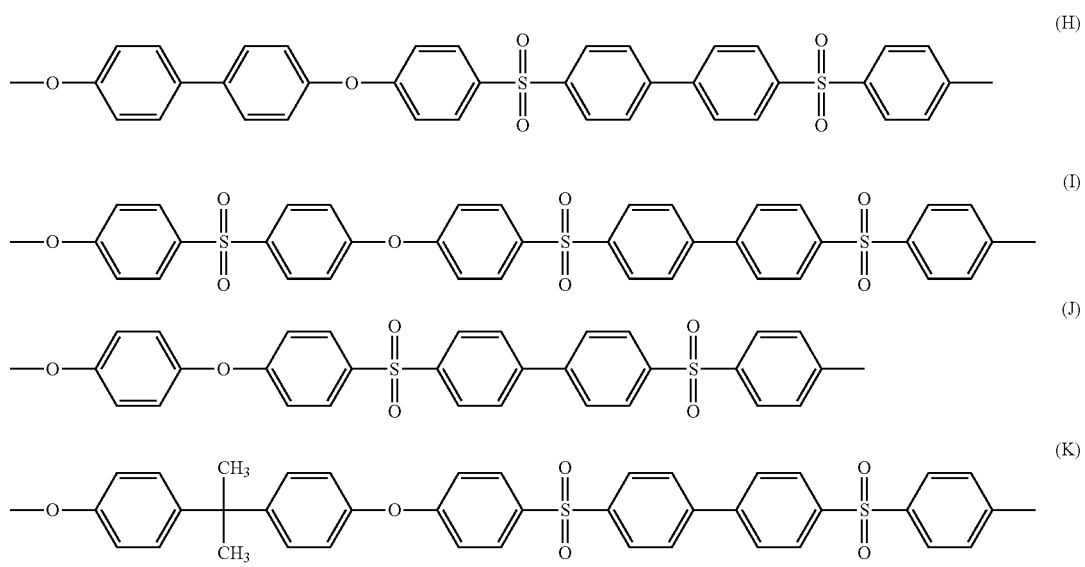

In a preferred embodiment, recurring units ($R_{PAES}$) are of formula (H), shown below:

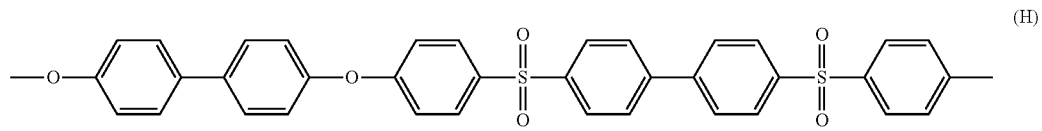

In another preferred embodiment, recurring units ($R_{PAES}$) are of formula (I), shown below:

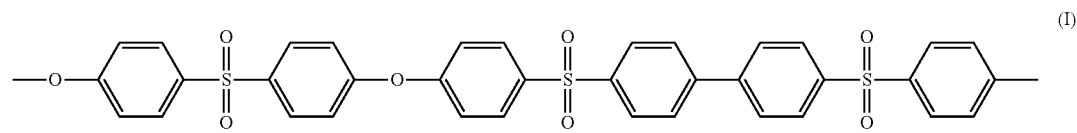

In the (PAES$_{HT}$) polymer, as detailed above, preferably more than 60% by moles, more preferably more than 80% by moles, still more preferably more than 90% by moles of the recurring units are recurring units (R$_{PAES}$), as above detailed.

Still, it is generally preferred that substantially all recurring units of the (PAES$_{HT}$) polymer are recurring units (R$_{PAES}$), as detailed above; chain defects, or very minor amounts of other units might be present, being understood that these latter do not substantially modify the properties of the (PAES$_{HT}$) polymer.

The (PAES$_{HT}$) polymer may be notably a homopolymer, a random, alternate or block copolymer. When the (PAES$_{HT}$) polymer is a copolymer, it may notably contain (i) recurring units (R$_{PAES}$) which are different from each other but both are complying with formula (B), or (ii) recurring units (R$_{PAES}$) of formula (B) and recurring units (R$_{PAES}$*) different from recurring units (R$_{PAES}$). (R$_{PAES}$*) can notably be selected from the group consisting of those of formulae (L) to (N) herein below:

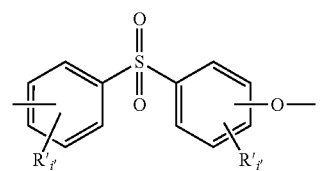
(L)

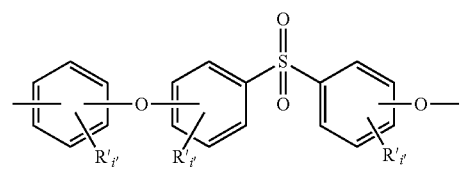
(M)

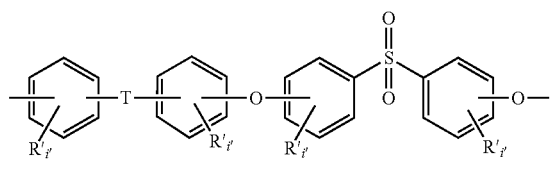
(N)

—SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$; independently of one another, is a hydrogen or a C$_1$-C$_{12}$-alkyl, C$_1$-C$_{12}$-alkoxy, or C$_6$-C$_{18}$-aryl group; —(CH$_2$)$_q$— and —(CF$_2$)$_q$— with q=integer from 1 to 6, or an aliphatic divalent group, linear or branched, of up to 6 carbon atoms; and mixtures thereof.

Specific recurring units (R$_{PAES}$*) can notably be selected from the group consisting of those of formulae (A), (D) to (F) herein below:

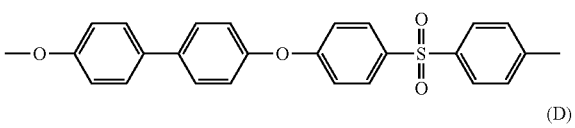
(A)

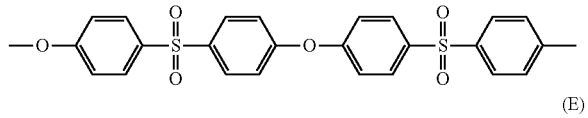
(D)

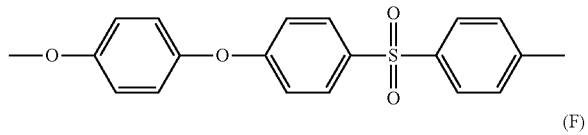
(E)

(F)

In one embodiment of the present invention, more than 50% by moles, more than 75% by moles, more preferably more than 90% by moles, more preferably more than 99% by moles, even more preferably substantially all the recurring units of the (PAES$_{HT}$) polymer are recurring units (R$_{PAES}$-1), chain defects, or very minor amounts of other units might be present, being understood that these latter do not substantially modify the properties of the (PAES$_{HT}$) polymer, wherein said recurring units (R$_{PAES}$-1), equal to or different from each other at each occurrence, are complying with following formula (O):

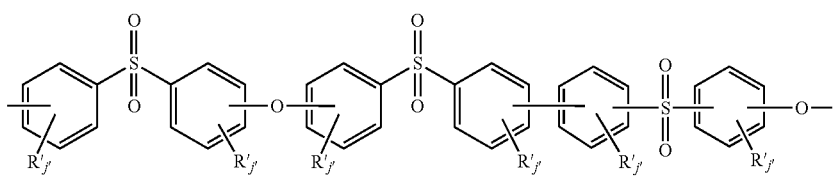
(O)

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of i', equal to or different from each other and at each occurrence, is independently zero or is an integer from 0 to 4;

each of T, equal to or different from each other, is selected from the group consisting of a bond, —CH$_2$—; —O—;

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other and at each occurrence, is independently zero or is an integer from 0 to 4.

In a more preferred embodiment of the present invention, more than 50% by moles, more than 75% by moles, more preferably more than 90% by moles, more preferably more than 99% by moles, even more preferably substantially all the recurring units of the (PAES$_{HT}$) polymer are recurring units (R$_{PAES}$-1), chain defects, or very minor amounts of other units might be present, being understood that these latter do not substantially modify the properties of the (PAES$_{HT}$) polymer, wherein said recurring units (R$_{PAES}$-1) are of formula (I), as detailed above.

In another embodiment of the present invention, more than 50% by moles, more than 75% by moles, more preferably more than 90% by moles, more preferably more than 99% by moles, even more preferably substantially all the recurring units of the (PAES$_{HT}$) polymer are recurring units (R$_{PAES}$-1), chain defects, or very minor amounts of other units might be present, being understood that these latter do not substantially modify the properties of the (PAES$_{HT}$) polymer, wherein said recurring units (R$_{PAES}$-1), equal to or different from each other at each occurrence, are complying with following formula (P):

moles, even more preferably substantially all the recurring units of the (PAES$_{HT}$) polymer are a mix of recurring units (R$_{PAES}$-1) and (R$_{PAES}$-2) wherein said recurring units (R$_{PAES}$-1) are complying with formula (I), as mentioned above and said recurring units (R$_{PAES}$-2) are complying with formula (H), as mentioned above.

When the (PAES$_{HT}$) polymer comprises, preferably consists essentially of a mix of recurring units (R$_{PAES}$-1) and (R$_{PAES}$-2), as detailed above, then the weight amount of the recurring units (R$_{PAES}$-1) in the (PAES$_{HT}$) polymer is generally of at least 1%, preferably at least 5%, preferably at least 15%, preferably at least 30%, more preferably at least 50%, more preferably at least 60%, even more preferably at least 75%, most preferably at least 87%, based on the total amount of recurring units (R$_{PAES}$-1) and (R$_{PAES}$-2) comprised in (PAES$_{HT}$) polymer. It is further understood that the weight amount of the recurring units (R$_{PAES}$-1) in (PAES$_{HT}$) polymer will generally be of at most 1%, preferably at most 5%, preferably at most 15%, preferably at most 30%,

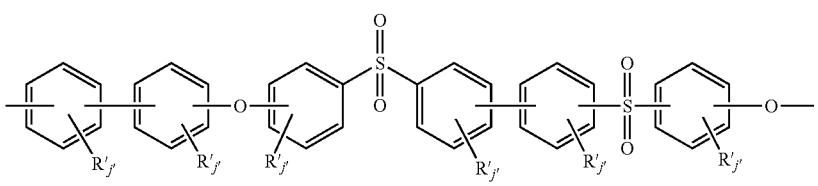

(P)

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other and at each occurrence, is independently zero or is an integer from 0 to 4.

In a preferred embodiment of the present invention, more than 50% by moles, more than 75% by moles, more preferably more than 90% by moles, more preferably more than 99% by moles, even more preferably substantially all the recurring units of the (PAES$_{HT}$) polymer are recurring units (R$_{PAES}$-1), chain defects, or very minor amounts of other units might be present, being understood that these latter do not substantially modify the properties of the (PAES$_{HT}$) polymer, wherein said recurring units (R$_{PAES}$-1) are of formula (H), as detailed above.

SUPRADEL™ HTS high-temperature sulfone polymer from Solvay Specialty Polymers US, L.L.C. is an example of a commercially available (PAES$_{HT}$) polymer comprising more than 50% by moles of the recurring units of formula (H).

In a more preferred embodiment of the present invention, more than 75% by moles, more preferably more than 90% by moles, more preferably more than 99% by moles, even more preferably substantially all the recurring units of the (PAES$_{HT}$) polymer are a mix of recurring units (R$_{PAES}$-1) and (R$_{PAES}$-2) wherein said recurring units (R$_{PAES}$-1) are complying with formula (O), as mentioned above and said recurring units (R$_{PAES}$-2) are complying with formula (P), as mentioned above.

In an even more preferred embodiment of the present invention, more than 75% by moles, more preferably more than 90% by moles, more preferably more than 99% by preferably at most 50%, more preferably at most 75%, even more preferably at most 92%, even more preferably at most 95%, even more preferably at most 98% and most preferably at most 99%.

Good results were obtained when the (PAES$_{HT}$) polymer comprised the recurring units (R$_{PAES}$-1) in an amount of 50-98° %, preferably of 75-95%, more preferably of 87-92%, based on the total amount of recurring units (R$_{PAES}$-1) and (R$_{PAES}$-2) comprised in (PAES$_{HT}$) polymer.

In a preferred embodiment of the present invention, the composition (C) comprises a (PAES$_{HT}$) polymer, wherein more than 75% by moles of the recurring units of the (PAES$_{HT}$) polymer are recurring units (R$_{PAES}$-1) according to formula (O), as mentioned above and (R$_{PAES}$-2) according to formula (P), as mentioned above and the weight amount of the recurring units (R$_{PAES}$-1) in the (PAES$_{HT}$) polymer ranges from 75-95% by moles, based on the total amount of recurring units (R$_{PAES}$-1) and (R$_{PAES}$-2).

In a more preferred embodiment of the present invention, the composition (C) comprises a (PAES$_{HT}$) polymer, wherein more than 75% by moles of the recurring units of the (PAES$_{HT}$) polymer are recurring units (R$_{PAES}$-1) according to formula (I), as mentioned above and (R$_{PAES}$-2) according to formula (H), as mentioned above and the weight amount of the recurring units (R$_{PAES}$-1) in the (PAES$_{HT}$) polymer ranges from 75-95% by moles, based on the total amount weight of recurring units (R$_{PAES}$-1) and (R$_{PAES}$-2).

Epispire® HTS high-temperature sulfone polymer from Solvay Specialty Polymers US, L.L.C. is an example of a commercially available (PAES$_{HT}$) polymer comprising more than 75% by moles of recurring units (R$_{PAES}$-1) according to formula (I), as mentioned above and (R$_{PAES}$-2) according to formula (H), as mentioned above and the weight amount of the recurring units (R$_{PAES}$-1) in the (PAES$_{HT}$) polymer ranges from 75-95% by moles, based on the total amount weight of recurring units ($R_{PAES}$-1) and ($R_{PAES}$-2).

The ($PAES_{HT}$) polymer can be prepared by any method. Methods well known in the art are those notably described in U.S. Pat. Nos. 2005/0228149 A1, 3,647,751 and 4,000,149; PCT patent applications WO 2005/095491 A1 and WO 2007/039538 A1, the whole content of which is herein incorporated by reference.

The molecular weight of the ($PAES_{HT}$) polymer, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g. The molecular weight of the ($PAES_{HT}$) polymer, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The melt flow rate (MFR) of the ($PAES_{HT}$) polymer at 400° C. and under a load of 5.0 kg, as measured in accordance with ASTM method D1238, is generally at most 80 g/10 min, preferably at most 50 g/10 min and preferably at most 40 g/10 min.

The melt flow rate (MFR) of the ($PAES_{HT}$) polymer at 400° C. and under a load of 5.0 kg, as measured in accordance with ASTM method D1238, is generally at least 2 g/10 min, preferably at least 4 g/10 min and more preferably at least 8 g/10 min.

($PAES_{HT}$) polymers having a melt flow rate (MFR) at 400° C. and under a load of 5.0 kg, as measured in accordance with ASTM method D1238 from 2 g/10 min to 50 g/10 min are especially suitable for providing the composition (C) of the present invention.

The ($PAES_{HT}$) polymer weight average molecular weight can be 20,000 to 100,000 grams per mole (g/mol) as determined by gel permeation chromatography using ASTM D5296 with polystyrene standards. In some embodiments the ($PAES_{HT}$) polymer weight average molecular weight can be 40,000 to 80,000 grams per mole (g/mol).

The ($PAES_{HT}$) polymer of the present invention has advantageously a glass transition temperature (Tg) of at least 220° C., preferably at least 225° C., more preferably at least 230° C., even more preferably at least 240° C., most preferably of at least 255° C.

The ($PAES_{HT}$) polymer may have glass transition temperatures (Tg) of 220 to 290° C.

Good results were obtained when the ($PAES_{HT}$) polymer has a glass transition temperature in the range 255 to 275° C.

The glass transition temperature (Tg) may be measured by Differential Scanning calorimetry (DSC) according to ASTM D 3418 Standard.

(PESU) Polymer

As said, more than 50% by moles of the recurring units are recurring units ($R_{PESU}$) of formula (C), as detailed above.

Preferred recurring units ($R_{PESU}$) are those complying with formula (D), shown below:

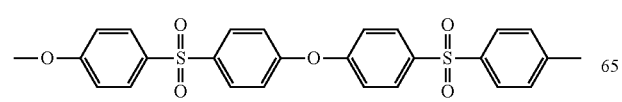

(D)

Preferably more than 75% by moles, preferably more than 85% by moles, preferably more than 95% by moles, preferably more than 99% by moles of the recurring units of the (PESU) polymer are recurring units of formula (C). Most preferably all the recurring units of the polyethersulfone are recurring units of formula (C), chain defects, or very minor amounts of other units might be present, being understood that these latter do not substantially modify the properties.

In a preferred embodiment of the present invention, more than 75% by moles, more preferably more than 90% by moles, more preferably more than 99% by moles, even more preferably substantially all the recurring units of the (PESU) polymer are of formula (D), chain defects, or very minor amounts of other units might be present, being understood that these latter do not substantially modify the properties.

The (PESU) polymer may be notably a homopolymer, or a copolymer such as a random or a block copolymer. When the (PESU) polymer is a copolymer, its recurring units are advantageously a mix of recurring units ($R_{PESU}$) of formula (D) and of recurring units ($R_{PESU}$*). These recurring units ($R_{PESU}$*) can notably be selected from the group consisting of those of formulae (L), (M) and (Q) herein below:

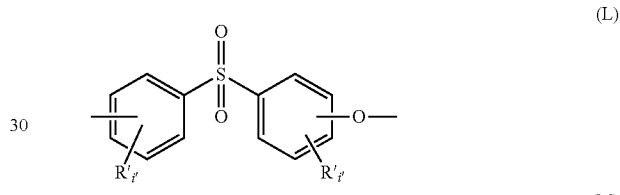

(L)

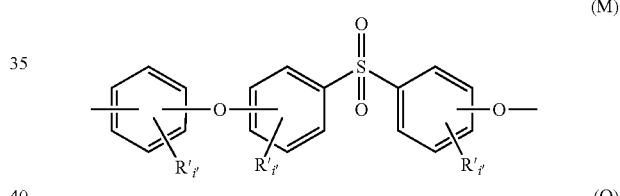

(M)

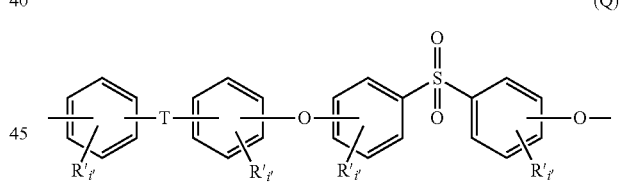

(Q)

wherein —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of i', equal to or different from each other and at each occurrence, is independently zero or is an integer from 0 to 4;

each of T, equal to or different from each other, is selected from the group consisting of a bond, —$CH_2$—; —O—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R^aC$=$CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —($CH_2$)$_q$— and —($CF_2$)$_q$— with q=integer from 1 to 6, or an aliphatic divalent group, linear or branched, of up to 6 carbon atoms; and mixtures thereof.

Specific recurring units ($R_{PESU}*$) can notably be selected from the group consisting of those of formula (A), (E) and (F) herein below:

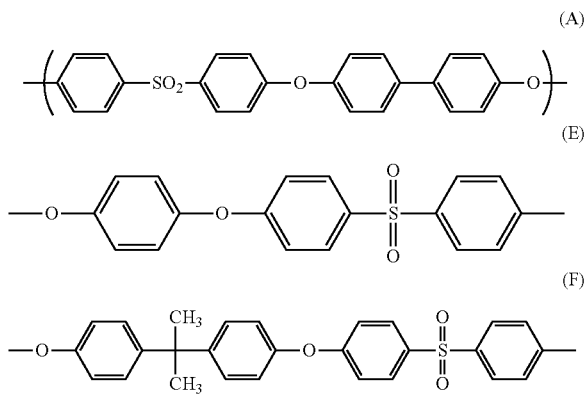

and mixtures thereof.

The (PESU) polymer can also be a blend of the previously cited homopolymer and copolymer.

The (PESU) polymer is notably available as VERADEL® PESU from Solvay Specialty Polymers USA, L.L.C.

(PESU) polymers can be prepared by known methods.

The (PESU) polymer has advantageously a melt flow rate (MFR) equal to or higher than 4 g/10 min at 380° C. and under a load of 2.16 kg, preferably equal to or higher than 7 g/10 min at 380° C. and under a load of 2.16 kg, more preferably equal to or higher than 10 g/10 min at 380° C. and under a load of 2.16 kg, as measured in accordance with ASTM method D1238; to measure said melt flow rate, a Tinius Olsen Extrusion Plastometer melt flow test apparatus can be used.

Upper boundary for the melt flow rate of the (PESU) polymer is not critical and will be selected by the skilled in the art as a matter of routine work. It is nevertheless understood that when the (PESU) polymer possibly comprised in the composition (C) possesses advantageously a melt flow rate of at most 100 g/10 min, preferably at most 80 g/10 min, more preferably at most 70 g/10 min, still more preferably at most 60 g/10 min, most preferably at most 50 g/10 min, when measured in accordance with ASTM method D1238 at 380° C. and under a load of 2.16 kg.

According to certain embodiments, the composition (C) will comprise a (PESU) polymer having a melt flow rate of 50 g/10 min or less, preferably of 40 g/10 min or less at 380° C. and under a load of 2.16 kg, preferably of 25 g/10 min or less at 380° C. and under a load of 2.16 kg: in other words, the (PESU) polymer of this embodiment will have a melt flow rate, measured as above detailed, ranging from at least 4 g/10 min to 50 g/10 min or less, preferably ranging from at least 15 g/10 min to 40 g/10 min or less, at 380° C. and under a load of 2.16 kg. VERADEL® A-201 NT PESU and VERADEL® A-301 NT PESU are examples of (PESU) polymers suitable for being used in this embodiment.

The VERADEL® PESU weight average molecular weight can be 20,000 to 100,000 grams per mole (g/mol) as determined by gel permeation chromatography using ASTM D5296 with polystyrene standards. In some embodiments the VERADEL® PESU weight average molecular weight can be 40,000 to 80,000 grams per mole (g/mol).

Should the composition (C) not comprise the reinforcing filler, the weight percent of the (P1) polymer in the composition (C) is generally of at least 10 wt. %, preferably of at least 20 wt. %, more preferably of at least 30 wt. %, based on the total weight of the composition (C). It is further understood that in the absence of the reinforcing filler, the weight percent of the polymer (P1) polymer) in the composition (C) will generally be of at most 85 wt. %, more preferably of at most 80 wt. %, more preferably of at most 75 wt. %, more preferably of at most 70 wt. %, based on the total weight of the composition (C).

In the absence of the reinforcing filler, excellent results were obtained when the composition (C) comprised the (P1) polymer in an amount of 30-70 wt. % based on the total weight of the composition (C).

Should the composition (C) comprise the reinforcing filler, the weight percent of the (P1) polymer in the composition (C) is generally of at least 5 wt. %, preferably of at least 10 wt. %, more preferably of at least 20 wt. %, more preferably of at least 30 wt. %, based on the total weight of the composition (C). It is further understood that in the presence of the reinforcing filler, the weight percent of the polymer (P1) in the composition (C) will generally be of at most 70 wt. %, more preferably of at most 65 wt. %, more preferably of at most 60 wt. %, more preferably of at most 50 wt. %, based on the total weight of the composition (C).

In the presence of the reinforcing filler, good results obtained when the composition (C) comprised the (P1) polymer in an amount of 30-65 wt. % based on the total weight of the composition (C).

The (P1) polymer may also be a blend composed of at least two (P1) polymers chosen from a group consisting of ($PAES_{HT}$) polymer and (PESU) polymer.

Reinforcing Fillers

A large selection of reinforcing fillers may be added to the composition (C). They are preferably selected from fibrous and particulate fillers. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5. Preferably, the aspect ratio of the reinforcing fibers is at least 10, more preferably at least 20, still more preferably at least 50.

Preferably, the reinforcing filler is selected from mineral fillers, such as notably talc, mica, titanium dioxide, kaolin, calcium carbonate, calcium silicate, magnesium carbonate); glass fiber; carbon fibers such as notably graphitic carbon fibers (some of them having possibly a graphite content of above 99%), amorphous carbon fibers, pitch-based carbon fibers (some of them having possibly a graphite content of above 99%), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite; silicon carbide fibers; boron fibers, graphene, carbon nanotubes (CNT) and the like.

It is understood that the skilled person will easily recognize the reinforcing filler which fits best its composition and encompassed end uses. Generally, the reinforcing filler is chosen depending on its chemical nature, its length, diameter, ability to feed nicely in compounding equipment without bridging and surface treatment (notably because good interfacial adhesion between the reinforcing filler and the polymer improves the strength and the toughness of the blend.

In one embodiment, the filler is chosen from fibrous fillers. Preferably, the fibrous filler are glass fibers.

In other embodiment, the fillers are non-fibrous.

Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers. The glass fibers have generally an equivalent diameter of 5 to 20 preferably of 5 to 15 µm and more preferably of 5 to 10 µm. All glass fiber types, such as A, C, D, E, M, S, R, T glass fibers (as described in chapter 5.2.3, pages 43-48 of *Additives for Plastics Handbook*, 2nd ed, John Murphy), or any mixtures thereof or mixtures thereof may be used. For example, R, S and T glass fibers are high modulus glass fibers that have typically an elastic modulus of at least 76, preferably at least 78, more preferably at least 80, and most preferably at least 82 GPa as measured according to ASTM D2343.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

The fibrous filler, in particular the glass fiber, has a diameter preferably below 40 µm, more preferably, its diameter is below 20 µm, and still more preferably below 15 µm. On the other hand, the diameter of the fibrous filler, in particular the glass fiber, is preferably above 5 µm.

The fibrous filler, in particular the glass fiber, has a length preferably of below 20 mm, more preferably below 10 mm. Besides, it has a length of preferably above 1 mm, more preferably above 2 mm.

Preferably, the fibrous filler, in particular the glass fiber, is formulated with a high temperature sizing. The Applicant observed that said high temperature sizing provided superior interfacial adhesion with polymers that require generally to be processed at high temperatures, like (PEEK), (PEKK) and (PPSU) polymers.

Especially well-suited reinforcing fillers are Owens-Corning Vetrotex 910A chopped fiberglass and equivalents thereof.

In another embodiment, the reinforcing filler in the polymer composition (C) is a carbon fiber.

For the purpose of the present invention, the term "carbon fiber" is intended to include graphitized, partially graphitized and ungraphitized carbon reinforcing fibers or a mixture thereof.

For the purpose of the present invention, the term "fiber" means a fundamental form of solid (often crystalline) characterized by relative high tenacity and a high ratio of length to diameter.

The term "graphitized" intends to denote carbon fibers obtained by high temperature pyrolysis (over 2000° C.) of carbon fibers, wherein the carbon atoms place in a way similar to the graphite structure.

Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials.

Carbon fibers useful for the present invention are preferably chosen from the group composed of PAN-based carbon fibers (PAN-CF), pitch based carbon fibers, graphitized pitch-based carbon fibers, and mixtures thereof.

PAN-based carbon fibers (PAN-CF) have advantageously a diameter of between 3 to 20 µm, preferably from 4 to 15 µm, more preferably from 5 to 10 µm, most preferably from 6 to 8 µm. Good results were obtained with PAN-based carbon fibers (PAN-CF) having a diameter of 7 µm.

The PAN-CF maybe of any length. In general, the length of PAN-CF is at least 50 µm.

Graphitized pitch-based carbon fibers are readily available from commercial sources containing at least about 50% weight graphitic carbon, greater than about 75% weight graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million lbs/in$^2$ (MSI). In certain embodiments the highly graphitic carbon fiber has a modulus of about 85 to about 120 MSI, and in other certain embodiments about 100 to about 115 MSI.

The pitch-based-CF has advantageously a diameter between 5 to 20 µm, preferably from 7 to 15 µm, more preferably from 8 to 12 µm.

The pitch-based-CF may be of any length. The pitch-based-CF has advantageously a length from 1 µm to 1 cm, preferably from 1 µm to 1 mm, more preferably from 5 µm to 500 µm and still more preferably from 50 to 150 µm.

Carbon fiber may be employed as chopped carbon fiber or in a particulate form such as may be obtained by milling or comminuting the fiber. Comminuted graphitized pitch-based carbon fiber suitable for use in the practice of the invention may be obtained from commercial sources including from Cytec Carbon Fibers as ThermalGraph DKD X and CKD X grades of pitch-based carbon fiber and Mitsubishi Carbon Fibers as Dialead carbon fibers. Chopped PAN-based carbon fibers preferably used in the present invention may be obtained from commercial sources.

When the reinforcing filler is present in the polymer composition (C), the at least one reinforcing filler is present in an amount of advantageously at least 5 wt. %, preferably at least 10 wt. %, more preferably at least 15 wt. %, based on the total weight of the polymer composition (C).

The reinforcing filler is also present in an amount of advantageously at most 45 wt. %, more preferably at most 40 wt. %, still more preferably at most 30 wt. %, based on the total weight of the polymer composition (C).

Other Ingredients

The polymer composition (C) may further optionally comprise other ingredients (I) such as a colorant such as notably a dye and/or a pigment such as notably titanium dioxide, zinc sulfide and zinc oxide, ultraviolet light stabilizers, heat stabilizers, antioxidants such as notably organic phosphites and phosphonites, acid scavengers, processing aids, nucleating agents, internal lubricants and/or external lubricants, flame retardants, a smoke-suppressing agents, an anti-static agents, anti-blocking agents, and/or conductivity additives such as carbon black and carbon nanofibrils.

The polymer composition (C) may also further comprise other polymers different from the (PAEK) polymer, (PPSU) polymer and the (P1) polymer, as detailed above. In particular, the polymer composition (C) may further comprise polymers such as polyetherimides, polycarbonates, polyphenylenes, polyesters and polyphenylene sulfides. Their addition can be useful notably when the composition (C) must meet certain particular requirements, as needed by certain special end uses.

When one or more other ingredients are present, their total weight, based on the total weight of polymer composition (C), is usually below 20%, preferably below 10%, more preferably below 5% and even more preferably below 2%.

The composition (C) of the invention is preferably consisting essentially of the (PAEK) polymer, as detailed above, the (PPSU) polymer, as detailed above, the (P1) polymer, as detailed above, optionally, the reinforcing filler, as detailed above, and optionally, other ingredients (I), as detailed above.

For the purpose of the present invention, the expression "consisting essentially of" are intended to denote that any additional ingredient different from the (PAEK) polymer, as detailed above, the (PPSU) polymer, as detailed above, the (P1) polymer, as detailed above, optionally, the reinforcing filler, as detailed above, and optionally, other ingredients (I) is present in an amount of at most 1% by weight, based on the total weight of the composition (C).

In one preferred embodiment, the composition (C) of the invention comprises, preferably consists essentially of:
  from 35 to 75 wt. % of at least one (PEEK) polymer,
  from 3 to 15 wt. % of at least one (PPSU) polymer,
  from 30 to 70 wt. % of at least one (PAES$_{HT}$) polymer characterized in that in said (PAES$_{HT}$) polymer more than 75% by moles of the recurring units are recurring units ($R_{PAES}$-1) according to formula (I), as mentioned above and ($R_{PAES}$-2) according to formula (H), as mentioned above and the weight amount of the recurring units ($R_{PAES}$-1) in said (PAES$_{HT}$) polymer ranges from 75-95% by moles, based on the total amount weight of recurring units ($R_{PAES}$-1) and ($R_{PAES}$-2);
and wherein all % are based on the total weight of the composition (C).

In another preferred embodiment, the composition (C) of the invention comprises, consists essentially of:
  from 35 to 75 wt. % of at least one (PEEK) polymer,
  from 3 to 15 wt. % of at least one (PPSU) polymer,
  from 30 to 70 wt. % of at least one (PESU) polymer; and wherein all % are based on the total weight of the composition (C).

In yet another preferred embodiment, the composition (C) of the invention comprises, preferably consists essentially of:
  from 5 to 30 wt. % of at least one (PEEK) polymer,
  from 3 to 15 wt. % of at least one (PPSU) polymer,
  from 30 to 65 wt. % of at least one (PAES$_{HT}$) polymer characterized in that in said (PAES$_{HT}$) polymer more than 75% by moles of the recurring units are recurring units ($R_{PAES}$-1) according to formula (I), as mentioned above and ($R_{PAES}$-2) according to formula (H), as mentioned above and the weight amount of the recurring units ($R_{PAES}$-1) in said (PAES$_{HT}$) polymer ranges from 75-95% by moles, based on the total amount weight of recurring units ($R_{PAES}$-1) and ($R_{PAES}$-2),
  from 15 to 30 wt. % of glass fibers
and wherein all % are based on the total weight of the composition (C).

In yet another preferred embodiment, the composition (C) of the invention comprises, consists essentially of:
  from 5 to 30 wt. % wt. % of at least one (PEEK) polymer,
  from 3 to 15 wt. % of at least one (PPSU) polymer,
  from 30 to 65 wt. % of at least one (PESU) polymer,
  from 15 to 30 wt. % of glass fibers, and wherein all % are based on the total weight of the composition (C).

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the (PAEK) polymer, as detailed above, the (PPSU) polymer, as detailed above, the (P1) polymer, as detailed above, optionally, the reinforcing filler, as detailed above, and optionally, other ingredients (I) is carried out by using high intensity mixers, such as notably Henschel-type mixers and ribbon mixers.

So obtained powder mixture can comprise the (PAEK) polymer, as detailed above, the (PPSU) polymer, as detailed above, the (P1) polymer, as detailed above, optionally, the reinforcing filler, as detailed above, and optionally, other ingredients (I) in the weight ratios as above detailed, suitable for obtaining finished articles by melt fabrication processes such as injection molding or extrusion, or can be a concentrated mixture to be used as masterbatch and diluted in further amounts of the (PAEK) polymer, as detailed above, the (PPSU) polymer, as detailed above, the (P1) polymer, as detailed above, optionally, the reinforcing filler, as detailed above, and, optionally, other ingredients (I) in subsequent processing steps.

It is also possible to manufacture the composition of the invention by further melt compounding the powder mixture as above described. As said, melt compounding can be effected on the powder mixture as above detailed, or preferably directly on the (PAEK) polymer, as detailed above, the (PPSU) polymer, as detailed above, the (P1) polymer, as detailed above, optionally, the reinforcing filler, as detailed above, and optionally, other ingredients (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of articles.

Another aspect of the present invention is related to articles comprising the above described polymer composition (C).

The articles according to the present invention are made from the polymer composition (C) using any suitable melt-processing method. In particular, they are made by injection molding or extrusion molding.

The polymer composition (C) is notably very well suited for the manufacture of articles useful in a wide variety of end uses.

Non limitative examples of articles according to the present invention are:

plumbing articles used for the transportation of water or other fluids under pressure such as fittings, rings, faucets, valves and manifolds. Common applications thereof include domestic hot and cold water, radiator heating systems, floor and wall heating and cooling systems, compressed air systems and piping systems for natural gas;

medical/dental/healthcare articles such as medical instruments or parts of instruments (notably handles and viewing glasses), components of medical equipments that handle or dispense chemicals used in medical procedures (such as anesthesia), cases and trays used to hold such instruments;

aircraft interiors articles such as panels and components (duct elements, structural brackets, fasteners, cabin interior components or other light or medium duty structural elements and components) on aircraft;

food service articles such as warming trays, steam table trays, plastic cook ware;

dairy equipment articles such as piping systems used for the collection or transportation of milk and other dairy products;

laboratory animal cages;

laboratory equipment articles such as funnels, filter device and other lab equipments;

electronic articles such as structural parts of electronic devices electric and electromagnetic wire insulation coatings mobile electronics structural and or other functional elements and components parts for automotive under-the-hood uses that encounter elevated temperatures and/or aggressive chemical environments parts and components for pumping and delivery of chemicals, solvents, oils or organic fluids at room temperature and elevated temperatures. This includes piping and fittings used in the chemical process industry and in hydraulics and in heat transfer fluid delivery systems.

Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

Raw Materials

KETASPIRE® KT-880 [MV (400° C., 1000 s$^{-1}$) ranges from 0.12-0.18 kPa·s; IV is 0.75 dl/g-0.77 dl/g] is an aromatic polyetheretherketone (PEEK) polymers commercially available from Solvay Specialty Polymers USA, LLC.

KETASPIRE® KT-820 [MV (400° C., 1000 s$^{-1}$) ranges from 0.38-0.50 kPa·s;] is an aromatic polyetheretherketone (PEEK) polymers commercially available from Solvay Specialty Polymers USA, L.L.C.

RADEL® R 5100 PPSU [MFR (365° C./5 kg) is in the range from 14-20 g/10 min] is a polyphenylsulfone (PPSU) homopolymer from Solvay Specialty Polymers USA, L.L.C.

Veradel® A-201 NT PESU [MFR (380° C./2.16 kg) is in the range from 15-25 g/10 min] is a polyethersulfone (PESU) homopolymer from Solvay Specialty Polymers USA, L.L.C.

Veradel® A-301 NT PESU [MFR (380° C./2.16 kg) is in the range from 25-35 g/10 min] is a polyethersulfone (PESU) homopolymer from Solvay Specialty Polymers USA, L.L.C.

EpiSpire® EP-340P high temperature sulfone polymer [MFR (400° C./5.0 kg) is in the range from 8-15 g/10 min] is (PAES$_{HT}$) polymer comprising recurring units (R$_{PAES}$-1) complying with formula (I) and recurring units (R$_{PAES}$-2) complying with formula (H). It has a glass transition temperature, Tg, of 268° C. and is commercially available from Solvay Specialty Polymers USA, LLC OCV 910A chopped fiberglass from Owens-Corning Vetrotex Hostanox PEPQ, an aromatic organic phosphonite melt thermal stabilizer available from Clariant Sachtolith-L, a zinc sulfide grade available from Sachtleben Chemie GmbH Zinc oxide, grade Aktiv® available from Lanxess Corp.

The following characterizations carried out on the materials of the Examples are indicated hereinafter:

Melt Flow Rate (MFR)

The melt flow rate (MFR) of the PEEK polymer at 400° C. and under a load of 2.16 kg, both in accordance with ASTM method D1238.

The melt flow rate (MFR) of the PPSU polymer was measured at 365° C. and under a load of 5 kg, in accordance with ASTM method D1238.

The melt flow rate (MFR) of the PESU polymer was measured at 380° C. and under a load of 2.16 kg, in accordance with ASTM method D1238.

The melt flow rate (MFR) of the (PAES$_{HT}$) polymer was measured at 400° C. and under a load of 5 kg, both in accordance with ASTM method D1238.

Viscosity Measurements

Melt viscosity (MV) measurements of PEEK polymers were made with a capillary rheometer according to ASTM D3835. Readings were taken at 400° C. using a die with the following characteristics: diameter: 1.016 mm, length: 20.32 mm, cone angle 120° and a shear rate of 1000 s$^{-1}$.

The viscosity of a melt of KETASPIRE® KT-880 PEEK polymers was also measured as a function of shear rate at 400° C. using an LCR-7000 Capillary Rheometer and using a die with the following characteristics: diameter: 1.016 mm, length: 20.32 mm, cone angle 120°, as shown in Table 1 below:

TABLE 1

| Shear Rate (1/s) | Visc. (kPa · s) at 400° C. |
|---|---|
| 100.2 | 0.225 |
| 400.9 | 0.187 |
| 1002.3 | 0.154 |
| 2505.7 | 0.121 |
| 5011.5 | 0.960 |
| 7015.9 | 0.850 |
| 10022.8 | 0.710 |

Intrinsic viscosity (IV) of the PEEK polymers were measured in 95-98% sulfuric acid (d=1.84 g/ml) at a polymer concentration of 0.1 g/100 ml at 25° C. using a Cannon-Fenske viscometer tube (No. 50) according to ASTM D2857.

General Description of the Compounding Process of the PEEK/PPSU/PESU and PEEK/PPSU/PAES$_{HT}$ Polymer Compositions Certain polymer compositions (e.g. PEEK/PPSU/PESU polymer compositions shown in Table 5; PEEK/PPSU/PAES$_{HT}$ polymer compositions shown in Table 6) were prepared by first tumble blending pellets of the resins to be blended at the desired compositional ratios for about 20 minutes, followed by melt compounding thereby using an 18 mm Leistritz co-rotating partially intermeshing twin screw extruder having an L/D ratio of 30:1. The extruder had 6 barrel sections with barrel sections 2 through 6 being heated (corresponding to Zones 1 through 5, respectively in Table 2). Vacuum venting was applied at barrel section 5 during compounding to strip off moisture and any possible residual volatiles from the compound. The compounding conditions are summarized in Table 2 for the PEEK/PPSU/PESU and PEEK/PPSU/PAES$_{HT}$ polymer compositions.

General Description of the Compounding Process of the PEEK/PPSU/PESU/Glass Fiber and PEEK/PPSU/PAES$_{HT}$/Glass Fibers Polymer Compositions The PEEK/PPSU/PESU/glass fibers and PEEK/PPSU/PAES$_{HT}$/glass fibers polymer composition, as shown in Table 7, were prepared by first tumble blending pellets of the resins to be blended at the desired compositional ratios for about 20 minutes, followed by melt compounding thereby using an Berstorff 25 mm twin-screw co-rotating partially intermeshing extruder. Vacuum venting was applied at barrel section 7 during compounding to strip off moisture and any possible residual volatiles from the compound. The PEEK polymer and the PAES$_{HT}$ polymer was fed gravimetrically at the right proportion into barrel section 1 (feed throat of the extruder). Fiberglass was fed gravimetrically at the right proportion into barrel section 5. When PPSU was present in the formulation it was pre-blended in pellet form with the PAES$_{HT}$ polymer pellets and then the mixture was fed at the desired feed rate using a gravimetric feeder. The compounding conditions are summarized in Table 3 for PEEK/PPSU/PESU/glass fibers and PEEK/PPSU/PAES$_{HT}$/glass fibers polymer composition.

TABLE 3

Compounding process conditions used in preparing the PEEK/PPSU/PESU/glass fiber and PEEK/PPSU/PAES$_{HT}$/glass fiber polymer compositions as shown in Table 7

| | Set Points |
|---|---|
| Barrel Section No. 2 | |
| Barrel Section No. 3 | |
| Barrel Section No. 4 | |
| Barrel Section No. 5 | |
| Barrel Section No. 6 | |
| Barrel Section No. 7 | |
| Barrel Section No. 8 | |
| Other Extruder Set Points and Readings | |
| Adapter Temperature (° C.) | 340 |
| Die Temperature (° C.) | 340 |
| Melt Temperature (° C.) | 390 |
| Screw Speed (rpm) | 210 |
| Torque (% of Max Available) | 75 |
| Total Feed Rate (lb/hr) | 20 |

The mechanical properties of the polymer compositions prepared were tested according to ASTM standards. For the preparation of the test specimen, in particular 1) Type I tensile bars, 2) 5 inch×0.5 inch×0.125 inch flexural bars, and 3) 4 inch×4 inch×0.125 inch plaques for the instrumented impact (Dynatup) testing.

The polymer compositions were molded on the 150-Ton Toshiba injection molder according to the conditions as shown in Table 4.

TABLE 4

Tensile and flex bars, and 4 × 4 × ⅛ inch plaques were made with the following conditions :

| ISO bars | Temp ° C. | 4 × 4 × ⅛" plaques | Temp ° C. |
|---|---|---|---|
| Zone 1 | 380 | Zone 1 | 375 |
| Zone 2 | 390 | Zone 2 | 375 |
| Zone 3 | — | Zone 3 | 365 |
| Zone 4 | 385 | Nozzle temp. | 365 |
| Zone 5 | 380 | | |
| Mold temp. | 195 | Mold temp. | 195 |

The various ASTM test methods employed were the following:

TABLE 2

Compounding process conditions used in preparing all polymer compositions (PEEK/PPSU/PESU polymer compositions shown in Table 5 and PEEK/PPSU/PAES$_{HT}$ polymer compositions shown in Table 6)

| | | Example | | | | | | |
|---|---|---|---|---|---|---|---|---|
| | Set Points | C1 Actual | C2 Actual | 3 Actual | C4 Actual | C5 Actual | 6 Actual | 7 Aetna |
| Zone 1 (° C.) | 330 | 330 | 317 | 291 | 318 | 313 | 314 | 286 |
| Zone 2 (° C.) | 330 | 330 | 330 | 330 | 330 | 360 | 360 | 360 |
| Zone 3 (° C.) | 335 | 335 | 335 | 335 | 330 | 360 | 360 | 360 |
| Zone 4 (° C.) | 340 | 340 | 340 | 340 | 340 | 355 | 355 | 355 |
| Zone 5 (° C.) | 340 | 340 | 340 | 340 | 340 | 350 | 350 | 350 |
| Die (° C.) | 340 | 340 | 340 | 340 | 340 | 298 | 299 | 302 |
| Melt Temperature (° C.) | — | 380 | 370 | 368 | 373 | 404 | 407 | 403 |
| Screw Speed (rpm) | — | 190 | 198 | 197 | 201 | 200 | 200 | 200 |
| Drive Torque (%) | — | 62 | 72 | 67 | 66 | 74 | 74 | 73 |
| Feed Rate (lb/hr) | — | 5 | 5 | 5 | 5 | 5.0 | 5.5 | 5.5 |
| Vacuum Level (mbar) | — | 850 | 800 | 750 | 800 | 500 | 500 | 700 |
| Die Swell? (Yes/No) | | Yes, Severe | Yes, Severe | No | Yes, Severe | Yes | No | No |

Flexural properties: D790
Tensile properties: D638
Notched Izod Impact: D256
Unnotched Izod Impact: D4812
Instrumented impact resistance also known by the name Dynatup impact: D3763
Heat deflection temperature (HDT): D648

The heat deflection temperature (HDT) was measured at an applied stress of 264 psi and using 0.125 in-thick flexural specimens annealed at 200° C. for 2 hours to assure uniform crystallinity and removal of residual molded-in stresses in the parts which can otherwise compromise the accuracy of the measurement.

In addition to mechanical property measurements, thermal characterization of the polymer compositions was also performed using differential scanning calorimetry (DSC) according to ASTM D3418.

Dynamic mechanical analysis (DMA) according to ASTM D4065 was also used as an alternate, more sensitive way to detect and quantify the glass transitions of the polymer compositions, providing hereby information about the compatibility level of these polymer compositions. The glass transitions by the DMA method were defined as the temperatures corresponding to the maximum in the damping coefficient (also known as tan delta) curve.

The mechanical and thermal properties are summarized in Tables 5, 6 and 7.

TABLE 5

| Examples N° | C1 | C2 | C3 | C4 |
|---|---|---|---|---|
| VERADEL ® A-201 NT PESU | 60 | 50 | 36.8 | 40 |
| KETASPIRE ® KT-880 PEEK polymer | 40 | 50 | 55.2 | 60 |
| RADEL ® R 5100 PPSU | 0 | 0 | 8 | 0 |

TABLE 5-continued

| Examples N° | C1 | C2 | C3 | C4 |
|---|---|---|---|---|
| Mechanical polymer composition (C) properties | | | | |
| Tensile Strength (psi) | 12700 | 12600 | 12400 | 12300 |
| Tensile Modulus (ksi) | 448 | 446 | 430 | 427 |
| Tensile Elongation (%) | 5.8 | 5.9 | 5.9 | 6.1 |
| Flexural Strength (psi) | 98 | 138 | 132 | 110 |
| Flexural Modulus (ksi) | 18200 | 17700 | 17600 | 17800 |
| Flexural Elongation (%) | 451 | 441 | 434 | 439 |
| Notched Izod Impact (ft-lb/in) | 1.28 | 1.29 | 1.42 | 1.32 |
| Unnotched Izod Impact (ft-lb/in) | NB | NB | NB | NB |
| Impact resistance properties | | | | |
| Heat Deflection Temperature (° C.) | 204.2 | 207 | 204 | 210 |
| Dynatup Total Energy (ft-lb) | 27.3 | 2.4 | 54.2 | 1.9 |
| Dynatup Maximum Load (lb) | 1028 | 157 | 1402 | 147 |
| Dynatup Deflection at Max Load (in) | 0.45 | 0.31 | 0.68 | 0.25 |
| Dynatup % Ductile Breaks | 0% | 0% | 100% | 0% |
| Thermal polymer composition (C) properties | | | | |
| DSC Tg1 (° C.) [2nd Heat] | 153.3 | 152.1 | 155.4 | 152.3 |
| DSC Tg2 (° C.) [2nd Heat] | 227.3 | 224.9 | 225.7 | 226.5 |
| DSC Tm (° C.) [2nd Heat] | 341.6 | 341.2 | 340.6 | 341.7 |
| DSC Tc (° C.) [1st Cool] | 264 | 262.8 | 261 | 263 |
| DSC Delta Hf (J/g) [2nd Heat] | 27.6 | 20.7 | 21.8 | 18 |
| DSC Delta Hf Normalized to PEEK Content (J/g) | 46 | 41.4 | 39.6 | 45 |
| DSC % Absolute Crystallinity | 21.2 | 15.9 | 16.8 | 13.8 |
| DSC % Absolute Crystallinity Normalized to PEEK Content | 35.4 | 31.8 | 30.5 | 34.6 |
| DMA Tg1 (° C.) [Tan Delta Peak] | 162.1 | 162.7 | 167.6 | 160.0 |
| DMA Tg2 (° C.) [Tan Delta Peak] | 228 | 227.0 | 227.4 | 228.0 |

NB refers to No breaks

TABLE 6

| | MOLDED | | | ANNEALED[a] | | |
|---|---|---|---|---|---|---|
| | Examples N° | | | | | |
| | C5 | 6 | 7 | C8 | 9 | 10 |
| EpiSpire ® EP-340 high temperature sulfone polymer | 60.0 | 57.6 | 55.2 | 60.0 | 57.6 | 55.2 |
| KETASPIRE ® KT-820 PEEK polymer | 40.0 | 38.4 | 36.8 | 40.0 | 38.4 | 36.8 |
| RADEL ® R 5100 PPSU | 0 | 4.0 | 8.0 | 0 | 4.0 | 8.0 |
| Mechanical polymer composition (C) properties | | | | | | |
| Tensile Strength (psi) | 13700 | 13600 | 13300 | 15000 | 14700 | 14600 |
| Tensile Modulus (ksi) | 458 | 457 | 455 | 476 | 473 | 472 |
| Tensile Elongation (%) | 6.8 | 6.7 | 6.6 | 7.2 | 7.0 | 6.8 |
| Flexural Strength (psi) | 28 | 33 | 31 | 10 | 16 | 15 |
| Flexural Modulus (ksi) | 18800 | 18600 | 18800 | 15000 | 14700 | 14600 |
| Flexural Elongation (%) | 454 | 451 | 466 | 476 | 473 | 472 |
| Notched Izod Impact (ft-lb/in) | 1.72 | 1.78 | 1.74 | | | |
| Impact resistance properties | | | | | | |
| Heat Deflection Temperature (° C.) | 55.4 | 58.6 | 57.4 | 32.1 | 53.5 | 54.8 |
| Dynatup Total Energy (ft-lb) | 1550 | 1600 | 1590 | 1470 | 1570 | 1580 |
| Dynatup Maximum Load (lb) | 46.2 | 46.1 | 48.6 | 31.6 | 43.1 | 44.3 |
| Dynatup Deflection at Max Load (in) | 0.69 | 0.68 | 0.70 | 0.55 | 0.62 | 0.64 |
| Dynatup % Ductile Breaks | 100 | 100 | 100 | 0 | 80 | 100 |

[a]The molded test specimens, as described above were further annealed for 4 hours at a temperature of 250° C. with the aim to simulate the impact performance of these materials after they have been exposed to elevated temperature during their normal course of service in high demanding applications such as notably engineering applications.

TABLE 7

| | Examples N° | | | | | | | |
|---|---|---|---|---|---|---|---|---|
| | 11 | C12 | 13 | C14 | 15 | C16 | 17 | C18 |
| VERADEL ® A-301 NT PESU | 54.49 | 59.49 | 44.49 | 49.49 | | | | |
| EpiSpire ® EP-340 high temperature sulfone polymer | | | | | 56 | 63 | 42 | 49 |
| KETASPIRE ® KT-880 PEEK polymer | 10 | 10 | 20 | 20 | 7 | 7 | 21 | 21 |
| 910 A Glass Fiber | 30 | 30 | 30 | 30 | 30 | 30 | 30 | 30 |
| RADEL ® R 5100 PPSU | 5 | 0 | 5 | 0 | 7 | 0 | 7 | 0 |
| Other ingredients (PepQ, ZnS, ZnO) | 0.51 | 0.51 | 0.51 | 0.51 | — | — | — | — |
| Polymer composition (C) properties | | | | | | | | |
| Tensile Strength (psi) | 22900 | 22100 | 24000 | 22900 | 23500 | 22500 | 25400 | 24900 |
| Tensile Modulus (ksi) | 1530 | 1500 | 1590 | 1540 | 1550 | 1550 | 1610 | 1620 |
| Tensile Elongation (%) | 2.5 | 2.3 | 2.6 | 2.3 | 2.4 | 2.2 | 2.7 | 2.4 |
| Flexural Strength (psi) | 33300 | 31700 | 35900 | 33700 | 33600 | 31200 | 36100 | 35000 |
| Flexural Modulus (ksi) | 1500 | 1480 | 1540 | 1500 | 1420 | 1370 | 1430 | 1430 |
| Flexural Elongation (%) | 2.59 | 2.43 | 2,76 | 2.56 | 2.68 | 2.68 | 3.01 | 2.82 |
| Notched Izod Impact (ft-lb/in) | 1.79 | 1.62 | 1,90 | 1.57 | 1.78 | 1.44 | 1.82 | 1.54 |
| Unnotched Izod Impact (ft-lb/in) | 15.1 | 13.7 | 17.9 | 14.8 | 15.27 | 14.20 | 18.80 | 15.96 |

The invention claimed is:

1. A composition (C) comprising:

from 1 to 90% by weight (wt. %) of at least one poly(aryl ether ketone), (PAEK) polymer, wherein more than 50% by moles of recurring units of the (PAEK) polymer are recurring units ($R_{PAEK}$) comprising a Ar—C(O)—Ar' group, with Ar and Ar', equal to or different from each other, being aromatic groups;

from 1 to 25 wt. % of at least one polyphenylsulfone polymer, (PPSU) polymer, wherein more than 50% by moles of recurring units of the (PPSU) polymer are recurring units ($R_{ppsu}$) of formula (A):

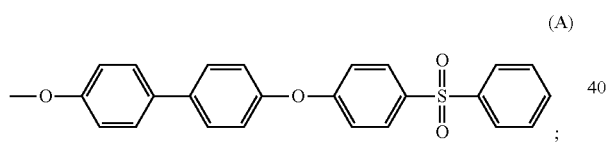

(A)

and from 30 to 85 wt. % of at least one poly(aryl ether sulfone) polymer, (P1) polymer, selected from at least one high temperature poly(aryl ether sulfone) polymer, ($PAES_{HT}$) polymer, wherein more than 50% by moles of recurring units of the ($PAES_{HT}$) polymer are recurring units ($R_{PAES}$), the recurring units ($R_{PAES}$), equal to or different from each other at each occurrence, are complying with formula (G):

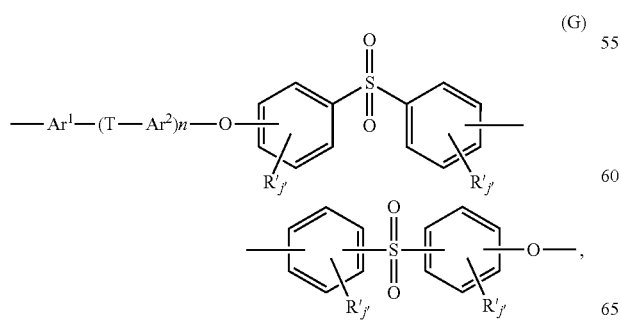

(G)

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other and at each occurrence, is independently an integer from 0 to 4;

$Ar^1$ and $Ar^2$ are equal or different from each other and at each occurrence, are independently aromatic moieties selected from the group consisting of those complying with following formulae:

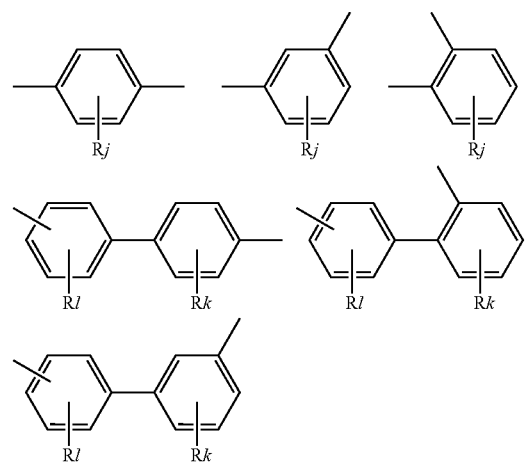

wherein each of R is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j, k and l, equal or different from each other, are independently 0, 1, 2, 3 or 4;

each of T, equal to or different from each other, is selected from the group consisting of a bond, —$CH_2$—; —O—; —$SO_2$—; —S—; —C(O)—; —$C(CH_3)_2$—;

—C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$; independently of one another, is a hydrogen or a C$_1$-C$_{12}$-alkyl, C$_1$-C$_{12}$-alkoxy, or C$_6$-C$_{18}$-aryl group ; —(CH$_2$)$_q$- and -(CF$_2$)$_q$— with q =integer from 1 to 6, or an aliphatic divalent group, linear or branched, of up to 6 carbon atoms ; and mixtures thereof ; and n is 0, 1, 2, 3 or 4; and from 0 to 50 wt. % of at least one reinforcing filler, and wherein all % are based on a total weight of the composition (C).

2. The composition (C) according to claim 1, wherein the recurring units (R$_{PAEK}$) are selected from the group consisting of formulae (J-A) to (J-O):

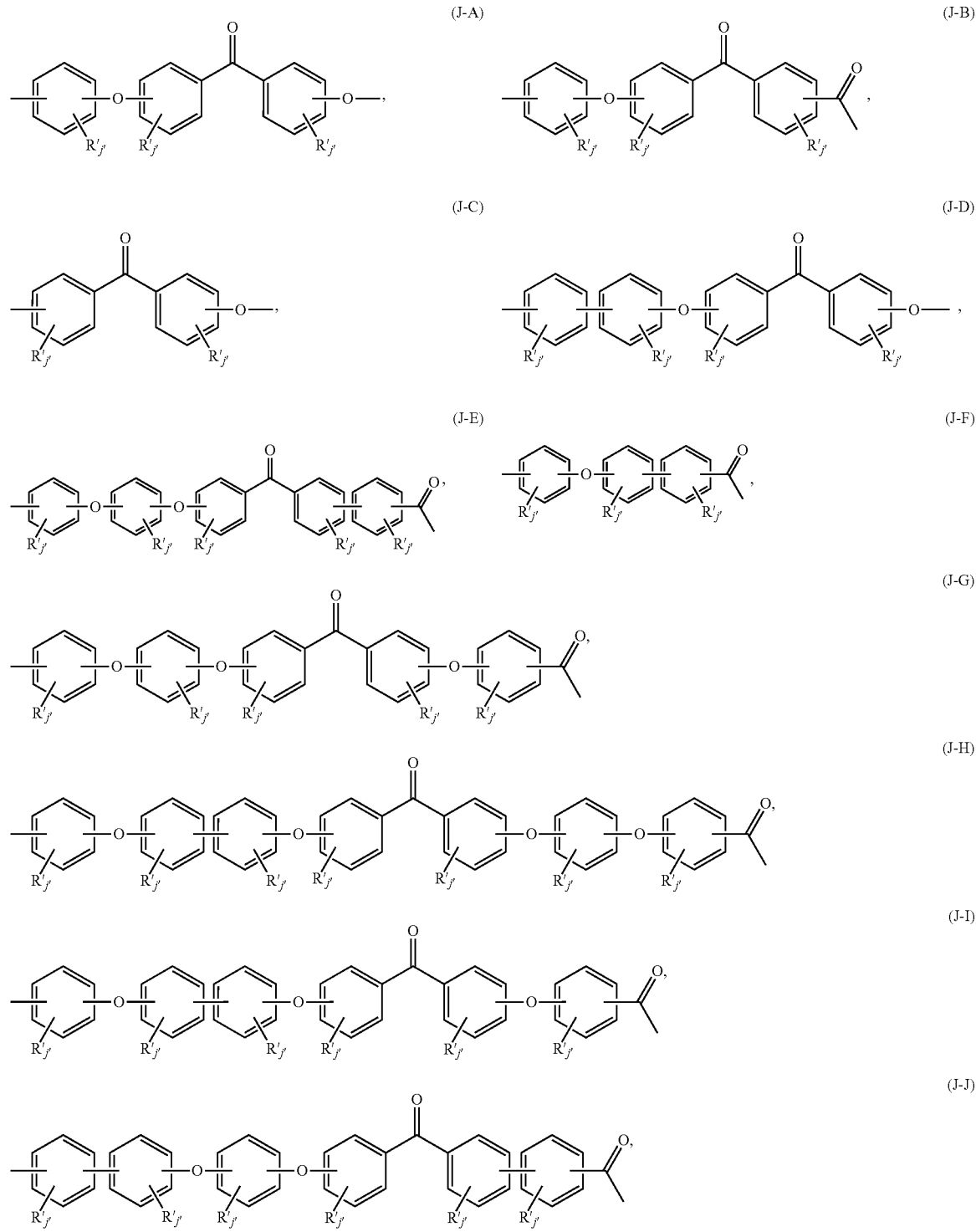

-continued

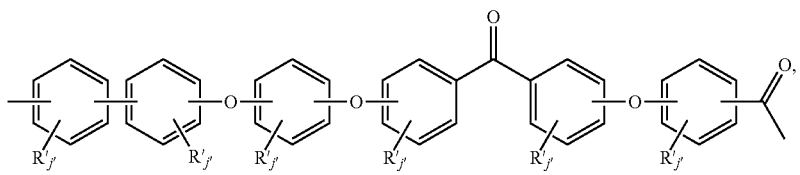 (J-K)

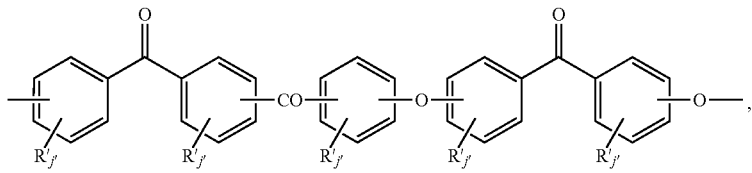 (J-L)

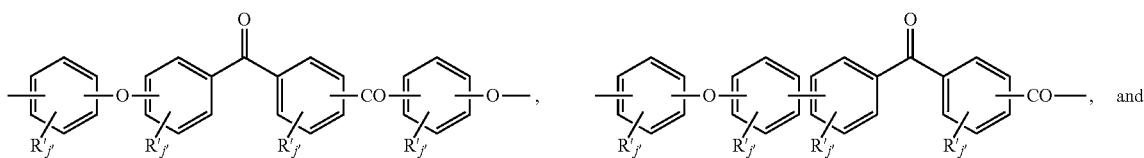

(J-M) (J-N) and (J-O)

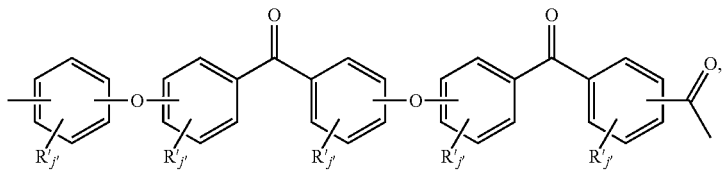

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
j is an integer from 0 to 4.

3. The composition (C) according to claim 1, wherein more than 50% moles of recurring units of the (PAEK) polymer are recurring units ($R_{PAEK}$) selected from the group consisting of formulae (J'-A) to (J'-O):

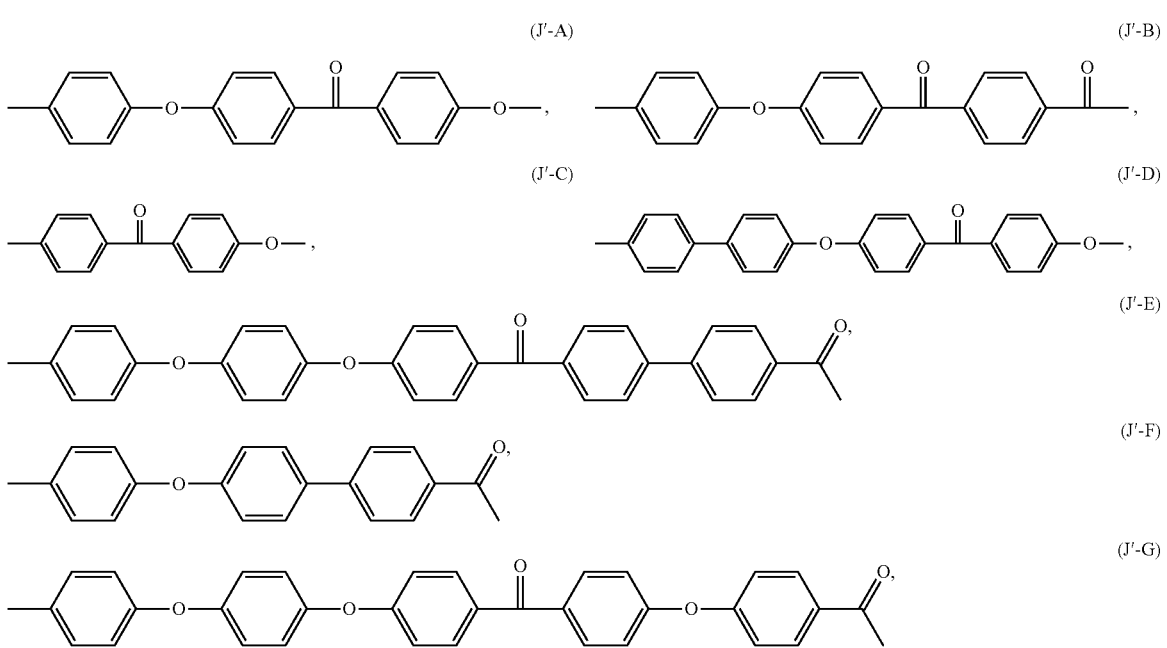

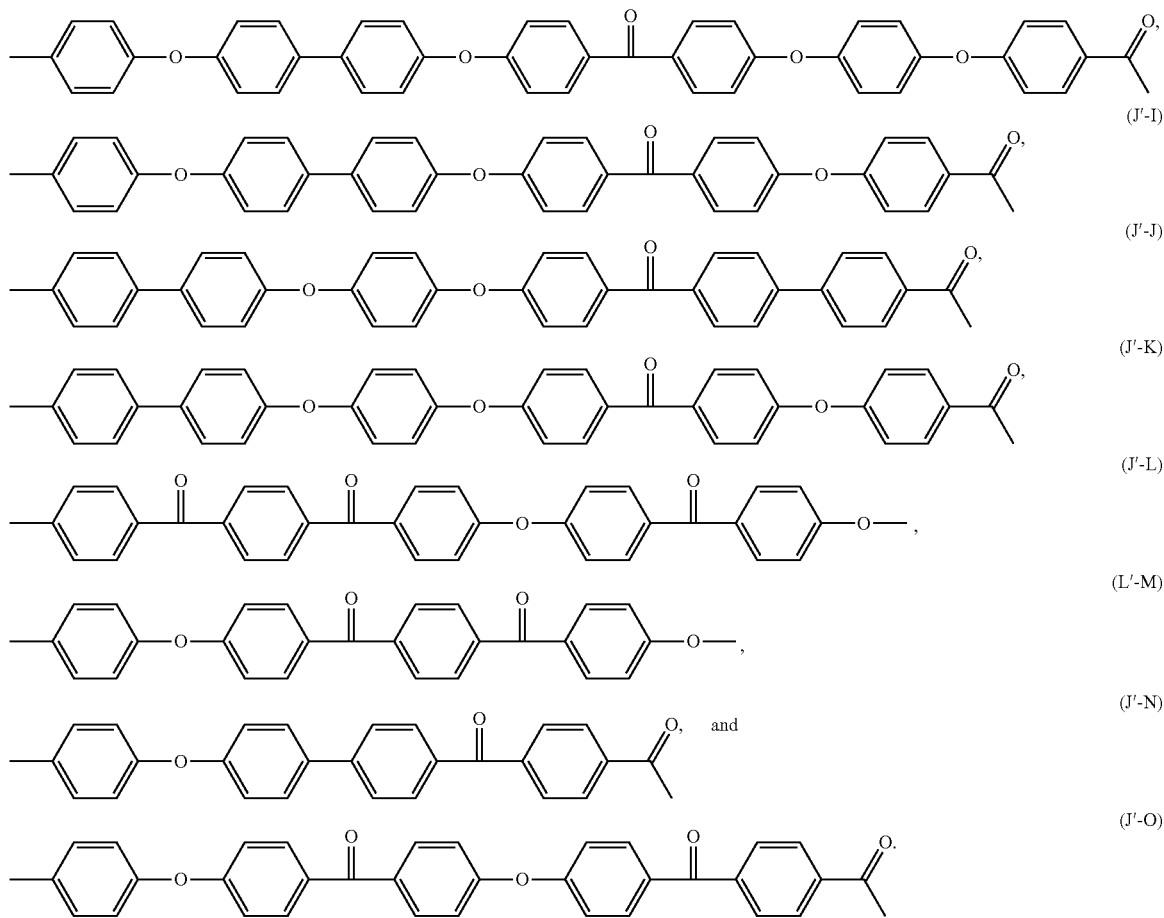

4. The composition (C) according to claim 1, comprising 35-75 wt. % of the (PAEK) polymer, based on the total weight of the composition (C), with the proviso that the reinforcing filler is absent.

5. The composition (C) according to claim 1, comprising 5-30 wt. % of the (PAEK) polymer, based on the total weight of the composition (C), with the proviso that the reinforcing filler is present.

6. The composition (C) according to claim 1, comprising from 4 to 10 wt. % of the (PPSU) polymer, based on the total weight of the polymer composition (C).

7. The composition (C) according to claim 1, wherein the recurring units ($R_{PAES}$) are those selected from the group consisting of formulae (H) to (K), as shown below, and mixtures thereof:

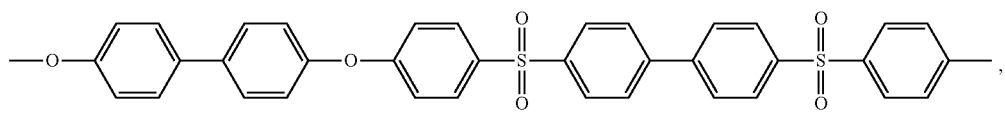

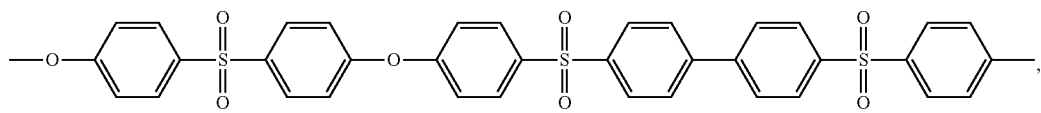

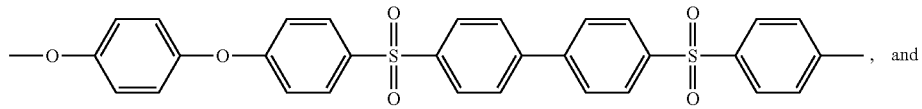

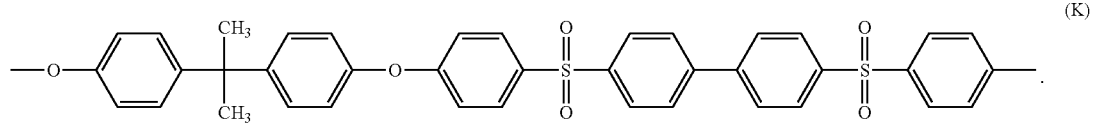

(K)

8. The composition (C) according to claim 1, wherein more than 75% by moles of the recurring units of the (PAES$_{HT}$) polymer are a mix of recurring units (R$_{PAES}$-1) and (R$_{PAES}$-2) wherein the recurring units (R$_{PAES}$-1) comply with formula (O):

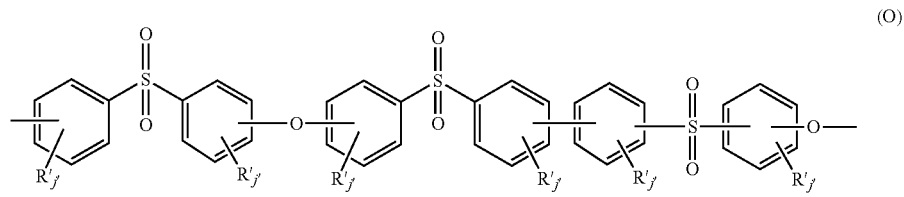

(O)

and the recurring units (R$_{PAES}$-2) comply with formula (P):

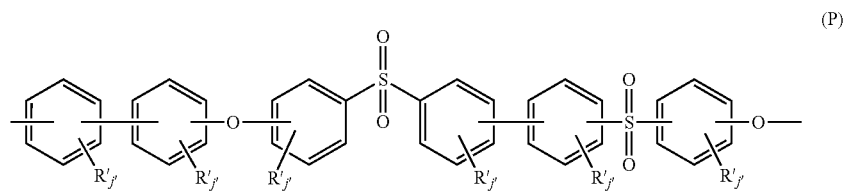

(P)

and the mole amount of the recurring units (R$_{PAES-1}$) in the (PAES$_{HT}$) polymer is from 50-98%, based on the total amount of recurring units (R$_{PAES-1}$) and (R$_{PAES-2}$) comprised in the (PAES$_{HT}$) polymer.

9. The composition (C) according to claim 1, comprising 30-70 wt. % of the (P1) polymer, based on the total weight of the composition (C), with the proviso that the reinforcing filler is absent.

10. The composition (C) according to claim 1, comprising 30-65 wt. % of the (P1) polymer, based on the total weight of the composition (C), with the proviso that the reinforcing filler is present.

11. The composition (C) according to claim 1, wherein the reinforcing filler is a glass fiber present in an amount equal to or at most 40 wt. %, based on the total weight of the polymer composition (C).

12. A process for manufacturing the polymer composition (C) according to claim 1, which comprises mixing:

a. the at least one (PAEK) polymer;

b. the at least one (PPSU) polymer;

c. the at least one (P1) polymer; and d. optionally, the at least one the reinforcing filler, and optionally, other ingredients (I).

13. An article comprising the polymer composition (C) according to claim 1.

14. The composition (C) according to claim 1 comprising 5 to 45 wt. % of the at least one reinforcing filler.

* * * * *